United States Patent
Mato, Jr. et al.

[11] Patent Number: 6,008,798
[45] Date of Patent: Dec. 28, 1999

[54] METHOD OF DETERMINING AN OBJECT'S POSITION AND ASSOCIATED APPARATUS

[75] Inventors: Stephan A. Mato, Jr., Katy; Richard M. Knox, Houston; Kevin F. Clancy, Spring, all of Tex.

[73] Assignee: Compaq Computer Corporation, Houston, Tex.

[21] Appl. No.: 08/885,213

[22] Filed: Jun. 30, 1997

Related U.S. Application Data

[63] Continuation-in-part of application No. 08/651,881, Jun. 4, 1996, Pat. No. 5,786,810, which is a continuation-in-part of application No. 08/486,310, Jun. 7, 1995, Pat. No. 5,734, 375.

[51] Int. Cl.[6] ........................................... G06F 3/023
[52] U.S. Cl. ................................ 345/168; 345/175
[58] Field of Search ........................... 345/168, 170, 345/175; 178/18.09, 18.11; 341/31; 250/215, 221, 227.21, 227.22, 233; 400/472; 463/37; 356/375, 380, 398

[56] References Cited

U.S. PATENT DOCUMENTS

| | | | |
|---|---|---|---|
| 4,507,557 | 3/1985 | Tsikos | 345/175 |
| 4,782,328 | 11/1988 | Denlinger | 345/175 |
| 4,811,004 | 3/1989 | Person et al. | 345/175 |

*Primary Examiner*—Jeffery Brier
*Attorney, Agent, or Firm*—Konneker & Smith, P.C.

[57] ABSTRACT

A method of determining an object's position and associated apparatus provides positional information in a form that may be conveniently communicated to a computer system to calculate the object's position. In a disclosed embodiment, representatively incorporated in a computer keyboard, a method of determining an object's position includes forming an optical grid of overlapping beacons and detecting reflections of the beacons produced by the object when it intersects the grid. The disclosed embodiment utilizes two focused beacons to produce the optical grid.

34 Claims, 9 Drawing Sheets

| 152 | GENERATE A LIGHT BEAM |
| 154 | PASS THE BEAM THROUGH A BEAM SPLITTER |
| 156 | PRODUCE A BEACON FROM THE BEAM |
| 158 | SEPARATE THE BEACON INTO TWO BEACON PORTIONS |
| 160 | SWEEP THE TWO BEACON PORTIONS OVER AN AREA IN WHICH THE POSITION OF AN OBJECT IS TO BE DETERMINED |
| 162 | REFLECT THE BEACON PORTIONS BACK TO THE BEAM SPLITTER |
| 164 | SENSE THE REFLECTED BEACON PORTIONS |
| 166 | DETERMINE THE OBJECT'S POSITION |

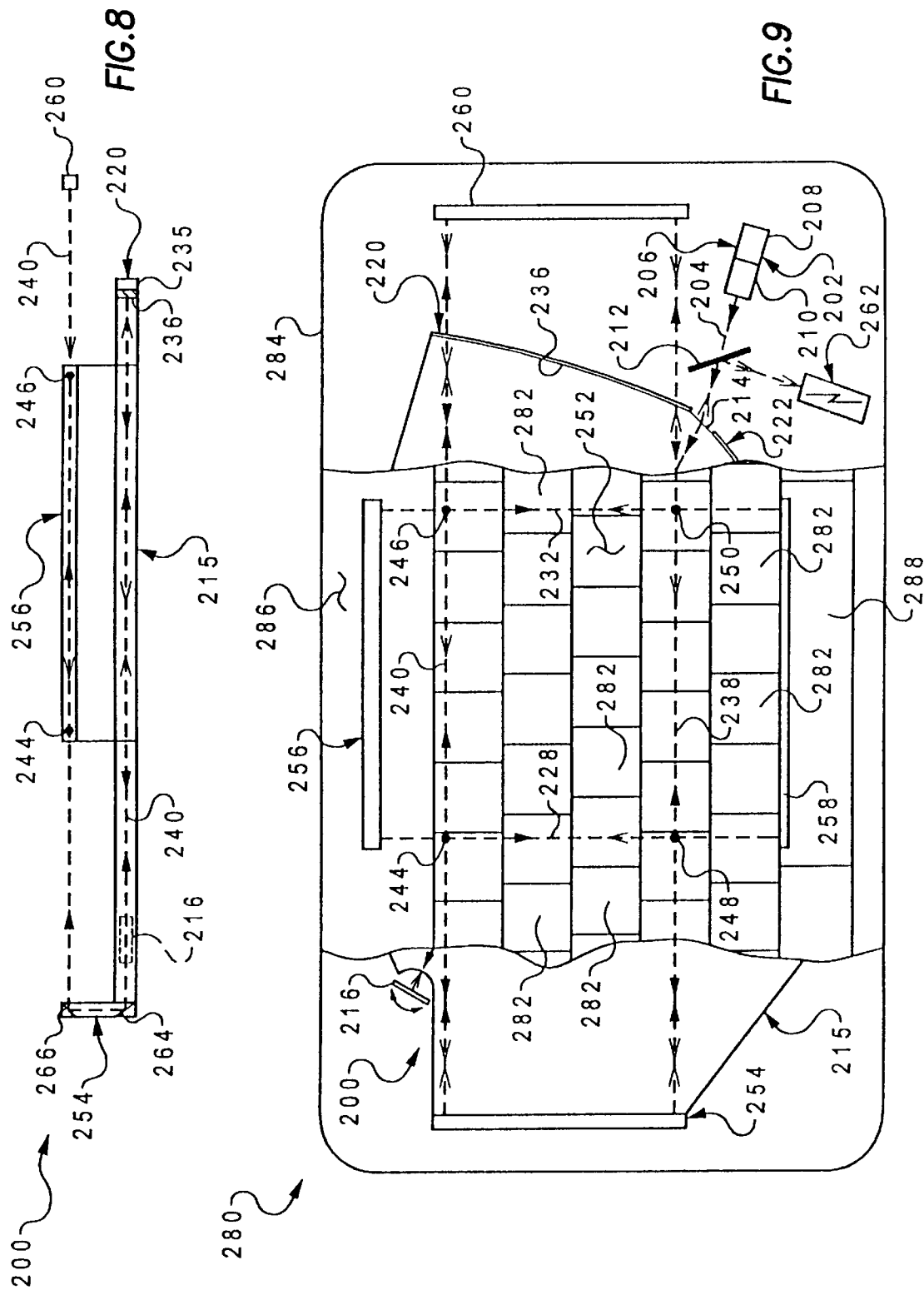

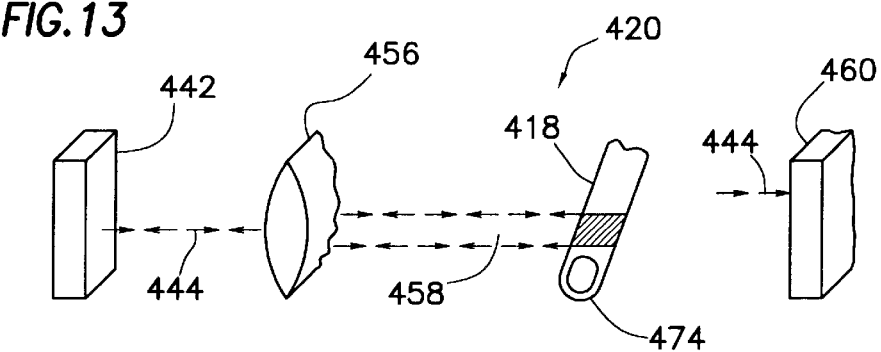
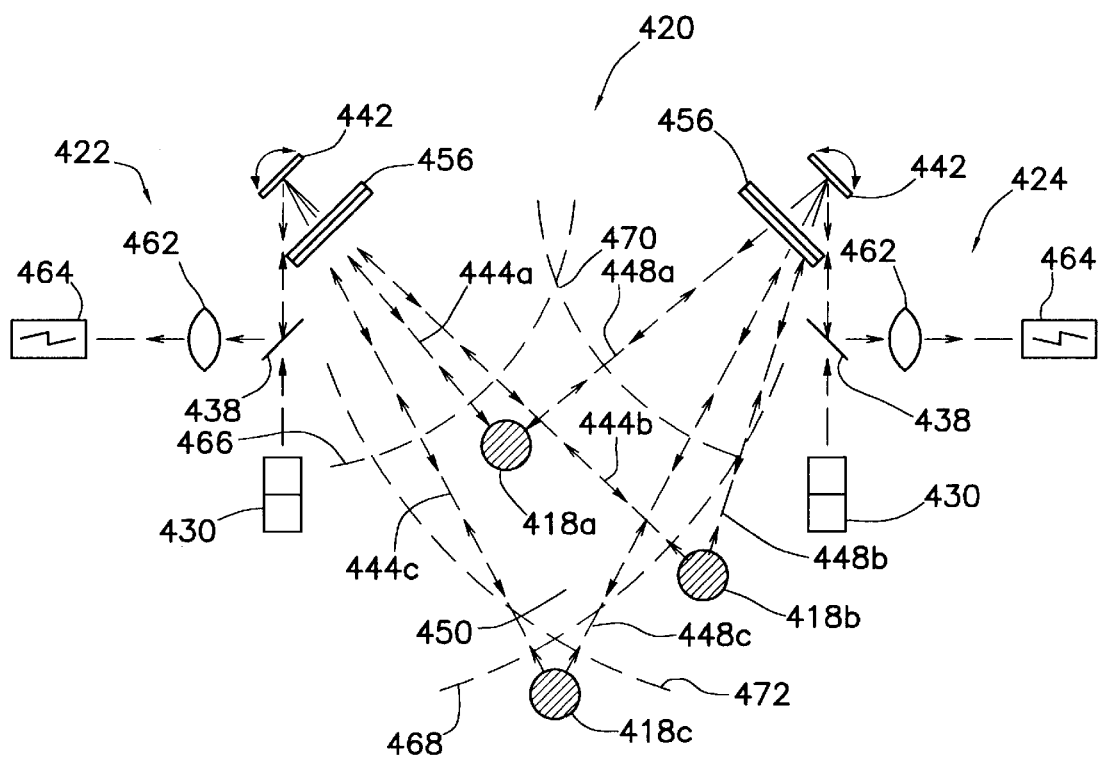

METHOD OF DETERMINING AN OBJECT'S POSITION AND ASSOCIATED APPARATUS

CROSS-REFERENCE TO RELATED APPLICATIONS

This application is a continuation-in-part of U.S. application Ser. No. 08/651,881, filed on Jun. 4, 1996, now U.S. Pat. No. 5,786,810, which is a continuation-in-part of U.S. application Ser. No. 08/486,310, filed on Jun. 7, 1995, now U.S. Pat. No. 5,734,375.

BACKGROUND OF THE INVENTION

1. Field of the Invention

The present invention relates generally to methods of determining an object's position and, in a preferred embodiment thereof, more particularly provides a method and apparatus for optically digitizing an object's position on a plane above a computer keyboard.

2. Description of Related Art

Pointing devices are well known in the computer art. Their purpose, generally, is to permit a computer user to input positional information to the computer. A pointing device performs this function by "digitizing" an object's relative position in space, that is, by putting the positional information in a form that is readable by the computer.

The number of uses for pointing devices have increased as modern computer user interfaces have become increasingly graphical. For example, a computer user may now use a "mouse" to select a file to open for editing purposes (by "clicking" on an icon representing the file), instead of typing a file name on a keyboard.

Typical pointing devices currently available to computer users include mouse, trackball, digitizing pad, joystick, touch screen, and eye tracking devices. There are variations of each of these and there are pointing devices that have a combination of features found on more than one of these. Each, however, has its disadvantages.

A mouse typically has a housing for grasping in the user's hand, and a ball underneath the housing for rolling the housing about on a desktop. Rollers inside the housing digitize the mouse's position by translating the ball's movement into electrical signals which are then communicated to the computer. Switches, typically mounted to the housing's top surface, allow the user to "click" (activate a switch to select an icon, for example) on an object displayed on the computer's screen, or perform other functions. The mouse, however, requires the user to devote a significant portion of a desktop as an area in which the mouse can be rolled around. The mouse also requires the user to remove one hand from the keyboard while the mouse is being rolled around on the desktop and/or while a mouse switch is being activated, thus slowing down the data entry process. Furthermore, the mouse requires a means of communicating the electrical signals to the computer, such as a cable which must be attached between the computer and the mouse and must follow the mouse around the desktop.

A trackball eliminates some of the mouse's disadvantages, but substitutes others in their place. The trackball is, essentially, an upside-down mouse, having a stationary housing with the ball facing upward so that the ball can be rolled by the user's fingers. The switches are normally placed on the top surface of the housing adjacent the ball. The rollers which translate the ball's motion into electrical signals are located in the housing where, due to the large upward-facing opening in the housing through which the ball protrudes, they are exposed to dust and dirt. Some keyboard manufacturers have eliminated the need for a separate trackball device cable for communicating the electrical signals to the computer by building the trackball device directly into the keyboard housing so that a single cable communicates both keyboard and trackball input to the computer. The user does, however, still have to move his or her hand away from the keyboard in order to roll the ball. Another disadvantage is that a large amount of dexterity is required to manipulate the trackball while clicking on a screen object, if only one hand is used.

A digitizing pad typically utilizes a rectangular planar area on the surface of a hard plastic housing, which, in turn, is placed on the user's desktop. The pad uses one of several methods to sense the position of a pen or stylus on the pad surface. In some pads, the pressure of the pen or stylus on the pad surface makes contact or changes capacitance in many fine, closely spaced conductors beneath the pad's surface. In some others, the pen or stylus carries a magnetic or electromagnetic field source which is sensed by the pad, thus, the pen or stylus position is sensed due to the proximity of the pen or stylus to the pad. Among the digitizing pad's disadvantages is the space on the desktop taken up by the pad's housing. Additionally, the user must remove his or her hand from the keyboard to operate the pen or stylus.

A joystick is another pointing device, and may have either a movable or a non-movable stick. The movable joystick operates similar to a trackball, except that a stick is inserted into the ball giving the user a means of grabbing the ball. The stick also limits movement of the ball. The non-movable joystick utilizes pressure sensors encircling the stick to sense the force and direction in which the user is pushing the stick. Thus, the non-movable joystick does not communicate a position to the computer, instead it senses a force vector which the computer may use to adjust the position of a screen object. With either type of joystick, manipulation of the switches and stick is very difficult with only one hand, thus, in order to use a joystick, the user must remove both hands from the keyboard.

Eyetracking devices use expensive, sophisticated methods of determining where on the computer screen the user's eyes are focused. In this way the user's hands do not have to leave the keyboard in order for the positional information to be communicated to the computer. Unfortunately, however, this technology is not within financial reach of most computer users.

Touch screens permit the user to communicate a position to the computer by actually touching an area on the computer screen. Usually the screen area is associated with an object or menu choice displayed on the screen. As with all of the aforementioned pointing devices, with the exception of the eyetracking devices, the user's hand must leave the keyboard to use the device.

From the foregoing, it can be seen that it would be quite desirable to provide a method of communicating an object's position to the computer which does not require the removal of either of the user's hands from the keyboard and which may be economically produced. It is accordingly an object of the present invention to provide such a method and associated apparatus.

SUMMARY OF THE INVENTION

In carrying out the principles of the present invention, in accordance with an embodiment thereof, a method is provided which permits the user to communicate positional information to the computer by reflecting light beacons in a light grid with the user's finger, without removing either of the user's hands from the keyboard. An apparatus is also provided which produces the light grid from one or more light sources and detects the position of an object reflecting light within the grid.

In broad terms, a method of sensing an object's position is provided, the method comprising the steps of generating a plurality of light beacons, sweeping the light beacons across an area, thereby forming alight grid of intersecting or overlying beacons, reflecting the beacons off of an object positioned within the grid, and receiving the reflected beacons into a plurality of light sensors.

In an optical digitizer apparatus disposed in relation to a keyboard used in a computer system, two light sources are utilized to produce a light grid in a plane above an upper surface of the keyboard. The light grid is formed by two beacons which are produced when two light beams from the two light sources are reflected off of two oscillating mirrors. When the beacons strike an object within the grid, the beacons are reflected back to the mirrors, off of two beam splitters, and to two light sensors.

In one aspect of the present invention, the light sensors may include imaging or non-imaging detectors. If imaging detectors are utilized, an image recognition program in the computer may permit the object to be recognized by the computer before determining the object's position. In this way, extraneous objects will not produce false position determinations.

In another aspect of the present invention, the beacons may be focused, so that the light grid is limited in area and/or shape. This may be accomplished by inserting one or more lenses in the paths of the reflected beacons. Lenses may also be utilized to restrict a width, height, etc. of the reflected beacons which are received at the light sensors.

In yet another aspect of the present invention, the position of the object in the light grid is determined by triangulation, based on the angular positions of the oscillating mirrors when the reflected beacons are received at the light sensors, and the positions of the mirrors with respect to each other. In this way, the beacons, reflected off of the object itself, are used to determine the object's position.

The use of the disclosed method and associated apparatus enables positional information to be conveniently and economically communicated to the computer. Use of the computer keyboard device embodiment enables the user's time to be more effectively utilized since the user's hands do not have to leave the keyboard to communicate positional information to the computer.

BRIEF DESCRIPTION OF THE DRAWINGS

FIG. 8 is a cross-sectional view through the optical digitizer of FIG. 7, taken along line 8—8 of FIG. 7;

FIG. 9 is a top plan view of a partially cut away computer keyboard having the optical digitizer of FIG. 7 thereon;

FIG. 13 is a schematic representation of a modification of the optical digitizer of FIG. 12; and FIG. 14 is a schematic representation of another modification of the optical digitizer of FIG. 12.

DETAILED DESCRIPTION

Figures 1, 2:
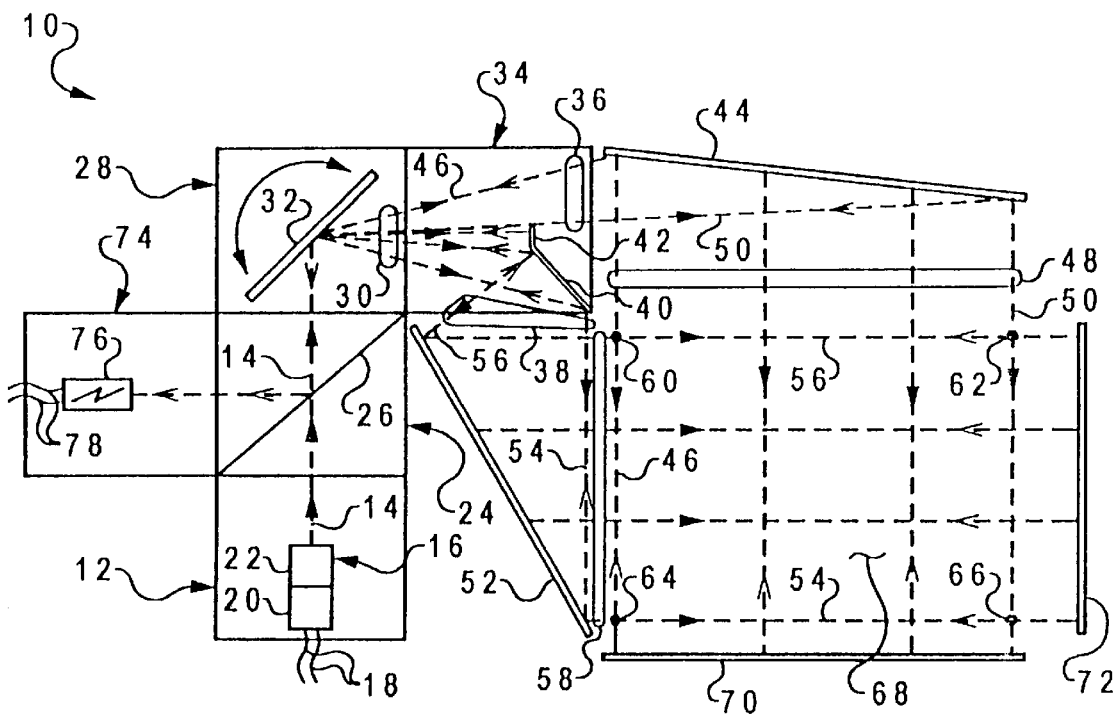
FIG. 1 is a schematic representation of an optical digitizer.
FIG. 2 is a flow chart illustrating a method of determining an object's position.

Illustrated in FIG. 1 is an optical digitizer 10. It is shown in highly schematicized form for the purpose of clarity. Dashed lines and arrows are used to represent paths and directions, respectively, of light. Filled arrowheads represent directions of unreflected light and unfilled arrowheads represent directions of reflected light in a manner that will become apparent as the following detailed description is read and understood.

A light source 12 provides a compact beam of light 14 which is in the infrared portion of the light spectrum in the illustrated embodiment. The light source 12 includes a laser 16 which, in turn, includes a light emitting diode 20 and a collimator 22. The light emitting diode 20 produces infrared light when leads 18 are connected to a power source (not shown). The infrared light produced by the light emitting diode 20 is made into the beam 14 having essentially parallel sides by the collimator 22.

The beam 14 next passes into a beam splitter 24. The beam splitter 24 includes a half-silvered mirror 26 which passes half of the beam 14 and reflects the other half. The reflected half of the beam 14 is not used in the illustrated embodiment, so it is not shown in FIG. 1.

The beam 14 next passes into a beacon generator 28. The beacon generator 28 produces a beacon 30 from the beam 14 by reflecting the beam 14 off of an oscillating mirror 32. The beacon 30 differs from the beam 14 in that the beacon 30 "sweeps" across a plane, whereas the beam 14 remains stationary. In other words, the beacon 30 is the beam 14 put into motion by the oscillating mirror 32.

It is to be understood that the beacon 30 may be generated from the beam 14 by another method. For example, instead of the oscillating mirror 32 in the beacon generator 28, a rotating polygonal mirror could be used to repeatedly and sequentially sweep beam 14 across an area. As a further example, beam 14 could be directed across a curved surface instead of a flat plane.

The beacon 30 is directed into a beacon separator 34. In the beacon separator 34, the beacon 30 is separated into several components. One component is (as viewed in FIG. 1) a horizontal component 36. The horizontal component 36 passes through the beacon separator 34 in the illustrated embodiment without any change in direction. Another component, a vertical component 38 (as viewed in FIG. 1), is reflected off of a mirror 40 so that it is directed in a direction different from the horizontal component 36.

In the area intermediate the horizontal component 36 and the vertical component 38 of the beacon 30 in the beacon separator 34 is a discriminating reflector 42. The purpose of the discriminating reflector 42 is to allow the optical digitizer 10 to discriminate the horizontal component 36 from the vertical component 38. The discriminating reflector 42 directs a small portion of the beacon 30 back to the oscillating mirror 32. The manner in which the discriminating reflector 42 allows discrimination between the horizontal and vertical components 36,38 will become clear upon further description of the embodiment below.

The horizontal component 36 of the beacon 30 next strikes a reflector 44 which directs the beacon 30 in a downward direction as viewed in FIG. 1. Thus, it can be seen that as the horizontal component 36 of the beacon 30 sweeps across the downwardly facing surface of reflector 44, it is made to sweep horizontally from side to side as viewed in FIG. 1. The uppermost limit of the horizontal component 36, illustrated as a beam 46 in the beacon separator 34, once reflected off of the reflector 44, becomes the leftmost limit of a horizontal beacon portion 48 as viewed in FIG. 1. The lowermost limit of the horizontal component 36, illustrated as a beam 50, once reflected off of the reflector 44, becomes the rightmost limit of the horizontal beacon portion 48 as viewed in FIG. 1. Therefore, the horizontal beacon portion 48 is nothing more than the horizontal component 36 of the beacon 30 reflected off of the reflector 44.

The reflector 44 in the illustrated embodiment is constructed of a material which enhances the accuracy of the optical digitizer 10. The material, a reflective angle film (RAF) available from the 3M Corporation, reflects light at the same angle independent of the angle at which the light strikes its surface, within limits. In FIG. 1, it can be seen that beam 46 strikes the reflector 44 (constructed of the RAF material) at a slightly different angle than does beam 50, however, once reflected off of reflector 44, beams 46 and 50 are parallel in the horizontal beacon portion 48. It is to be understood that the reflector 44 does not have to be made of the RAF material, and that beams 46 and 50 do not have to be parallel in the horizontal beacon portion 48.

The reflector 44 could have a curved shape instead of the linear shape representatively illustrated in FIG. 1. In that way, a beam passing over the surface of the reflector 44 could be reflected in a direction which depends upon the curvature of the reflector 44.

Vertical component 38 of the beacon 30, after leaving the mirror 40 in the beacon separator 34, strikes a reflector 52 which is made of the RAF material in the illustrated embodiment. A beam 54, farthest to the right in the vertical component 38 as illustrated in FIG. 1, strikes the reflector 52 and is reflected to the right in a direction orthogonal to the horizontal beacon portion 48. A beam 56, farthest to the left in the vertical component 38, strikes the reflector 52 and is also directed to the right, orthogonal to horizontal beacon portion 48 as illustrated in FIG. 1. Thus, it can be seen that vertical component 38 of the beacon 30 is reflected off of reflector 52 so that it sweeps vertically, as illustrated in FIG. 1, between the representatively shown beams 54 and 56, forming a vertical beacon portion 58 which is orthogonal to horizontal beacon portion 48. Note that, as with reflector 44 described above, reflector 52 could have a curved shape and could be made of other materials.

Since beam 14 is continuously directed to the oscillating mirror 32 in the beacon generator 28, the resulting beacon 30 is also continuous. Therefore, although beams 46 and 50 are illustrated as being at the outer limits of horizontal beacon portion 48, and beams 54 and 56 are illustrated as being at the outer limits of vertical beacon portion 58, it is important to understand that the beam 14, in the form of the vertical or horizontal beacon portion 48,58 sweeps continuously between these outer limits. Note, however, that at any one instant in the illustrated embodiment, beam 14 may be directed to the horizontal beacon portion 48 or vertical beacon portion 58, but not both.

It is also important to note at this point that although separate beams 46,50,54,56 are referred to in this description of the illustrated embodiment, no two of these are present at one time, since they all emanate from the same beam 14 produced by the light source 12. Beams 46,50,54,56 representatively illustrated in FIG. 1 are all simply different positions of beam 14. Likewise, different beacon portions 48,58 and beacon components 36,38 are just parts of beacon 30, which is, in turn, made up of different positions of beam 14 produced by the oscillating mirror 32.

Beam 56 intersects beam 46 at point 60 and intersects beam 50 at point 62. Beam 54 intersects beam 46 at point 64 and intersects beam 50 at point 66. Since the horizontal beacon portion 48 is orthogonal to the vertical beacon portion 58, points 60, 62, 64, and 66 define the corners of a rectangular light grid 68. In this light grid 68, the horizontal beacon portion 48 sweeps from side to side, and the vertical beacon portion 58 sweeps from top to bottom, as representatively illustrated in FIG. 1. For the purpose of further description of the illustrated embodiment, the defined beginning of the sweep of the horizontal beacon portion 48 shall be at its leftmost limit (beam 46 as illustrated in FIG. 1), and the defined beginning of the sweep of the vertical beacon portion 58 shall be at its upper limit (beam 56 as illustrated in FIG. 1).

It is to be understood that the light grid 68 could have a shape other than rectangular. If, as described above, beams 46 and 50 are not parallel to each other, a trapezoid shape is produced. If, additionally, beams 56 and 54 are not parallel to each other, another polygonal shape is produced. Light grid 68 may take virtually any shape as long as no beam in the horizontal beacon portion 48 is collinear with a beam in the vertical beacon portion 58.

Reflector 70, representatively illustrated in FIG. 1 as being horizontally disposed at the lowermost extent of horizontal beacon portion 48, reflects the horizontal beacon portion 48 directly back in the direction of reflector 44. Unfilled arrowheads on beams representatively illustrated in horizontal beacon portion 48 indicate the direction of beams which have reflected off of reflector 70. Thus, beams in the horizontal beacon portion 48 are reflected back to reflector 44, thence back through the beacon separator 34 to the oscillating mirror 32 in the beacon generator 28, and thence to the beam splitter 24.

In a similar manner, reflector 72, representatively illustrated in FIG. 1 as being vertically disposed at the right-hand edge of vertical beacon portion 58, reflects the vertical beacon portion 58 directly back in the direction of reflector 52. Unfilled arrowheads on beams representatively illustrated in vertical beacon portion 58 indicate the direction of beams which have reflected off of reflector 72. Thus, beams in the vertical beacon portion 58 are reflected back to reflector 52, thence back to the mirror 40 in the beacon separator 34, thence to the oscillating mirror 32 in the beacon generator 28, and thence to the beam splitter 24.

Reflectors 70 and 72, in the illustrated embodiment, are made of a material which reflects light back in the same direction at which it initially strikes the material. It is known to those skilled in the art as retro-reflecting film. There are several types of retro-reflecting film, including micro corner cube and micro sphere. The micro corner cube type has been found to give acceptable results in the illustrated apparatus.

Figure 6A:
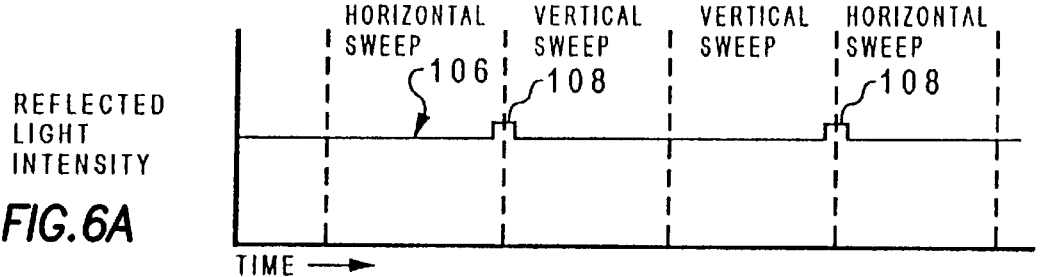
FIG. 6A is a plot of light reflected back to a light sensor of the optical digitizer when the light grid is totally unobstructed.

In the illustrated embodiment, with no obstruction blocking the path of any beam, the cumulative total of the beams reflected back from the horizontal and vertical beacon portions 48,58 and the discriminating reflector 42 to the beam splitter 24 is continuous and equal to the beam 14 which leaves the beam splitter 24 to enter the beacon generator 28 (see FIG. 6A and accompanying description). It is to be understood, however, that as beam 14 is reflected off of various surfaces and passes through various components of the illustrated embodiment, transmission errors and various inefficiencies in reflecting the beam 14 will result in a loss in light intensity by the time it is reflected back to the beam splitter 24.

Discriminating reflector 42 in the beacon separator 34 takes advantage of the above-mentioned loss in light intensity by reflecting a small portion of the beacon 30 back to the beam splitter 24 before it reflects off of any of the other reflecting surfaces 40,44,52,70,72. This produces a momentary increase in light intensity reflected back to the beam splitter 24 to aid in discriminating between the horizontal and vertical components 36,38 of the beacon 30 reflected back to the beam splitter 24. Other methods of discrimination may also be utilized. For example, a nonreflective surface could be provided in place of discriminating reflector 42, which would produce an absence of reflected light between the horizontal and vertical components 36,38 reflected back to the beam splitter 24. Alternatively, a series of coded nonreflecting lines could be positioned near the ends of the reflectors 70,72, the code telling the computer that a horizontal and/or vertical sweep has ended and/or begun. Yet another method of telling a horizontal from a vertical sweep would be to provide an encoder on the oscillating mirror 32 so that the mirror's position and, therefore, the direction of the beam 14 is communicated to the computer.

The reflected beam 14, representatively illustrated in FIG. 1 having an unfilled arrowhead, enters the beam splitter 24 and strikes the half-silvered mirror 26. A portion of the reflected beam 14 is directed to a light sensor 74. A photodiode 76 in the path of the reflected beam 14 is capable of measuring the beam's intensity. The photodiode 76 has leads 78 for connecting to measurement electronics (not shown). Other methods of measuring the beam's intensity may also be used. Use of the apparatus illustrated in FIG. 1, and the resulting measurements of the intensity of the reflected beam 14 over time, allow the position of an object in the light grid 68 to be determined.

Turning now to FIG. 2, an embodiment of a method 150 of determining an object's position is representatively illustrated. The method embodiment is for determining the object's position on a two-dimensional plane, although other embodiments may be used to determine the object's position in one or three dimensions, the object's velocity or acceleration, etc.

Commencing with step 152, a light beam is generated. The light beam is compact and is composed of light rays which are essentially parallel to each other. The more compact the light beam, the greater the resolution capability, and the more the light rays are parallel to each other, the greater the accuracy of the method 150.

Through testing, it has been found that a conventional light emitting diode-type infrared laser having an integral collimator produces a suitable light beam for use with the method 150. Other suitable light beam producers are commercially available, for example, a laser of the type typically used in compact disk drives. It is not necessary that the light beam produced be in the infrared range of the light spectrum.

Continuing with step 154, the beam is passed through a beam splitter. The purpose of the beam splitter in the method 150 is to separate the light which is later reflected back to the beam splitter from the light beam produced in step 152. The method 150 utilizes a half-silvered mirror which passes fifty percent of the light beam, and reflects fifty percent of the light beam. Other beam splitter configurations suitable for use with the method 150 are commercially available, such as a dual prism having a partially-reflective film between the prisms.

In the method 150, the fifty percent of the light beam produced in step 152 which is reflected by the beam splitter is not utilized. It is to be understood, however, that this reflected fifty percent of the light beam could be utilized to, for example, produce a beacon as described hereinbelow for use in determining an object's position, without deviating from the principles of the present invention.

Continuing with step 156, a beacon is produced from the unreflected fifty percent of the light beam which is passed through the beam splitter. In the method 150, an oscillating mirror is used to reflect the beam back and forth repeatedly, thereby producing the beacon. The oscillating mirror is also used later in the method 150 to reflect the beacon produced in this step back to the beam splitter.

Other beacon producing means are suitable for use in the method 150, for example, a rotating polygonal mirror. In some respects, a rotating mirror has advantages over the oscillating mirror. For example, a rotating mirror produces a beacon which sweeps over an area repeatedly in only one direction, instead of back and forth, making it somewhat less complex to later differentiate between the forward and backward sweeps. Another advantage of a rotating mirror is that it typically produces a linear sweep rate, that is, the beam is made to sweep over an area with a relatively constant angular velocity, making it somewhat less complex to later compute the relationship between the beam's position and time. In comparison, the oscillating mirror typically produces a sinusoidal sweep rate. However, the oscillating mirror is used in the embodiment method 150 because it has less bulk and fewer moving parts than a typical rotating mirror.

Continuing with step 158, the beacon produced in step 156 is separated into two beacon portions. Each of the beacon portions so separated is used later to determine the object's position in one dimension. Therefore, two beacon portions are needed in the method 150, since the object's position is to be determined in two dimensions.

In the method 150, a beacon separator is utilized in step 158 which has a reflective surface partially extending into the area swept by the beacon produced in step 156. The reflective surface diverts a portion of the beacon so that it may, separately from the undiverted portion of the beacon, be swept across the two-dimensional plane in which the object's position is to be determined. Other means of separating the beacon into multiple portions, for example a prism, may also be utilized.

Continuing with step 160, the two beacon portions separated in step 158 are swept over an area in which the position of the object is to be determined. In the method 150, the area is the two-dimensional plane discussed above. The two beacon portions are swept over the area such that the beacon portions are orthogonal to each other. In this manner, later computations of the object's position are somewhat less complex. It is to be understood, however, that it is not necessary for the beacon portions to be orthogonal to each other when being swept over the area in which the position of the object is to be determined.

To direct the beacon portions over the two-dimensional plane such that they are orthogonal to each other, each beacon portion is reflected off of a reflective surface having the property that the reflected beacon portion leaves the reflective surface at a relatively constant angle regardless the angle at which the beacon portion strikes the reflective surface. Thus, the angle of one beacon portion leaving one reflective surface may be positioned so that it is orthogonal to the other beacon portion leaving the other reflective surface.

Other means may be utilized to direct the beacon portions orthogonally over the two-dimensional plane. For example, each beacon portion could be reflected off of a curved reflector having a curvature such that the beacon portion would be reflected in the same direction no matter where the beacon portion strikes the curved reflector.

Continuing with step 162, after being swept over the area in which the position of the object is to be determined, the beacon portions are reflected back to the beam splitter. The object, being positioned in the two-dimensional plane swept by the beacon portions, obstructs a fragment of each beacon portion, thus preventing its reflection back to the beam splitter.

For reflecting each beacon portion back to the beam splitter, a reflective surface is utilized having the property that it reflects light back in the same direction at which the light strikes the reflective surface. Other means, such as a mirror, may be utilized for reflecting each beacon portion back to the beam splitter.

Note that, in this step 162 of the method 150, the beacon portions are reflected back off of each reflective surface in a direction opposite to that which they had reflected off those reflective surfaces in the previous steps, namely, the reflective surfaces utilized to orient the beacon portions orthogonally described in step 160 above, the reflective surface utilized in the beacon separator described in step 158 above (only the beacon portion diverted in step 158), and the oscillating mirror utilized for producing the beacon as described in step 156 above.

Continuing with step 164, the beacon portions reflected back to the beam splitter in step 162 are directed to a light sensor. The light sensor measures the intensity of the beacon portions reflected back to the beam splitter.

A photodiode suitable for measuring the intensity of infrared light is utilized to measure the intensity of the beacon portions reflected back to the beam splitter. Other light sensors may be used as well. It is to be understood, however, that the light sensor must be capable of measuring the intensity of the light produced in step 152 and must be capable of detecting the unreflected fragments of the beacon portions, described above in regard to step 162.

Continuing with step 166, the object's position in the two-dimensional plane is determined. In the method 150, the unreflected fragments of the beacon portions, detected in step 164 above, indicate the position of the object, since the object caused those fragments to not be reflected back to the beam splitter in step 162 above.

One unreflected fragment will be present in each beacon portion reflected back to the beam splitter in the method 150. By computing the position of the unreflected fragment in each beacon portion, the position of the object in each of two dimensions can be determined.

A microprocessor is utilized to time the unreflected fragment in each beacon portion and compute the object's position, based on the sinusoidal sweep rate of the oscillating mirror. Since, in the method 150, the beacon portions are orthogonal to each other, the object's position can be directly computed in Cartesian coordinates in the two-dimensional plane. If, however, the beacon portions are not orthogonal to each other, the object's Cartesian coordinates can still be computed, albeit using more complex calculations.

Figure 3:
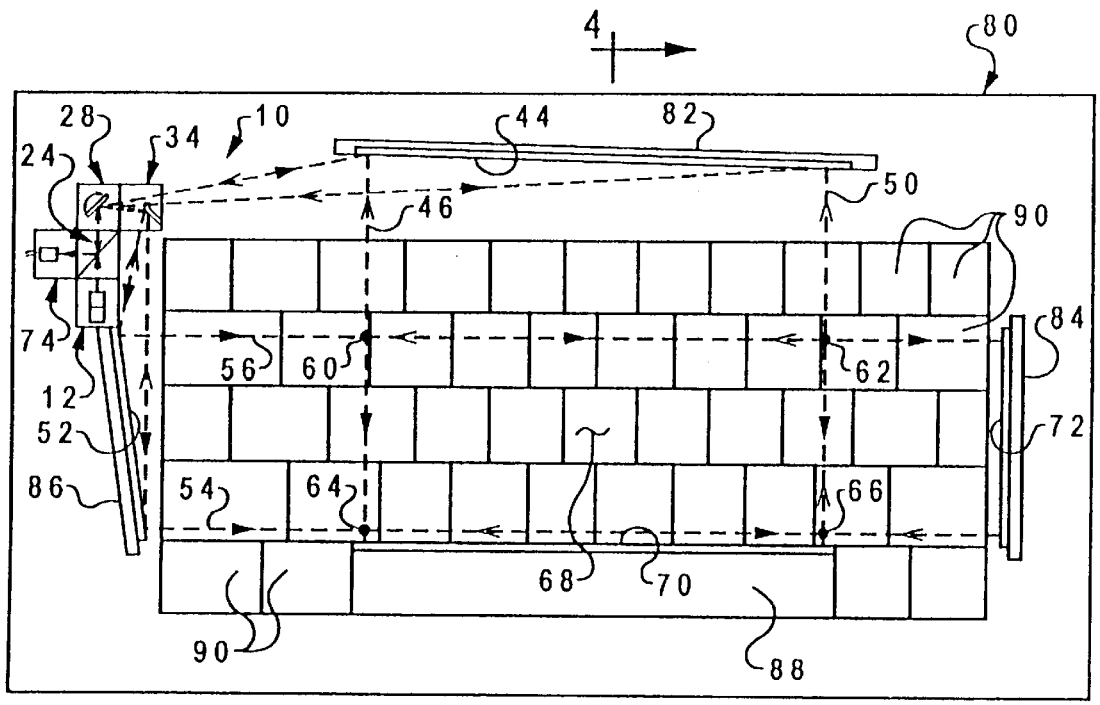
FIG. 3 is a top plan view of a computer keyboard having the optical digitizer of FIG. 1 thereon.

Turning now to FIG. 3, the optical digitizer 10 is representatively illustrated as being disposed on a computer keyboard 80 having keys 90. The keyboard 80 is otherwise conventional, suited for input of text by typing on keys 90, and is typically used in conjunction with a computer.

As representatively illustrated in FIG. 3, the top surface of the keyboard 80 having the keys 90 thereon is in a vertical orientation, with the side which typically faces the user being at the bottom of the illustration. It is to be understood that, in the following description, the use of the terms "vertical" and "horizontal" refer to the representatively illustrated orientation of the keyboard 80 in FIG. 3. Stated in another manner, the "vertical" direction runs up and down, and the "horizontal" direction runs side to side in FIG. 3.

Light source 12, beam splitter 24, beacon generator 28, beacon separator 34, and light sensor 74 (combinatively forming the previously described optical digitizer 10) are shown in schematicized form, conveniently mounted near the upper left-hand portion of the keyboard 80, although other positionings of these elements are possible.

Reflector 44 is mounted on a support 82 to the rear of the keys 90. Reflector 72 is mounted on a support 84 to the right of the keys 90. Reflector 52 is mounted on a support 86 to the left of the keys 90. Reflector 70 is mounted on an upwardly extending and rearwardly facing portion of a space bar 88.

Points 60,62,64,66 form the corners of the rectangular light grid 68. At the light grid's horizontal extremities are beams 46 and 50. At the light grid's vertical extremities are beams 54 and 56. Thus, in the illustrated embodiment, the light grid 68 is positioned over a portion of the keys 90. The light grid 68 may be enlarged or reduced to any convenient size or shape and may overlay all, a portion of, or none of the keys 90.

Figure 4:
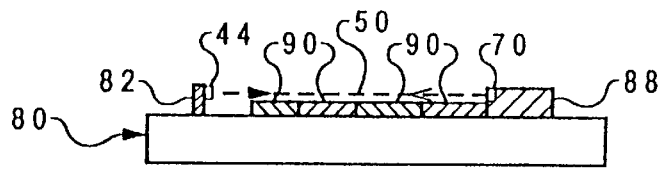
FIG. 4 is a cross-sectional view through the keyboard, taken along line 4—4 of FIG. 3.

Illustrated in FIG. 4 is a cross-sectional view taken along line 4—4 through the keyboard 80 illustrated in FIG. 3. In this view, the spacing between the keys 90 and the beam 50 can be seen. Reflectors 44 and 70 are positioned just above the keys 90, reflector 44 being mounted to support 82, and reflector 70 being mounted to the space bar 88.

Positioning the optical digitizer 10 in this manner allows a computer user to operate the digitizer 10 without removing the user's hands from the keyboard 80. The user can conveniently lift the fingers slightly above the keyboard 80, activate the optical digitizer 10 by, for example, pressing an appropriate control or function key on the keyboard, and then use one finger to obstruct the light grid 68 and thereby communicate positional information, select a screen object, etc. When the user is finished using the digitizer 10, it is deactivated by, for example, pressing another control or function key, and the user may type on the keys 90 again. This is all accomplished without the user's hands leaving their normal positions above the keyboard 80.

Figure 5:
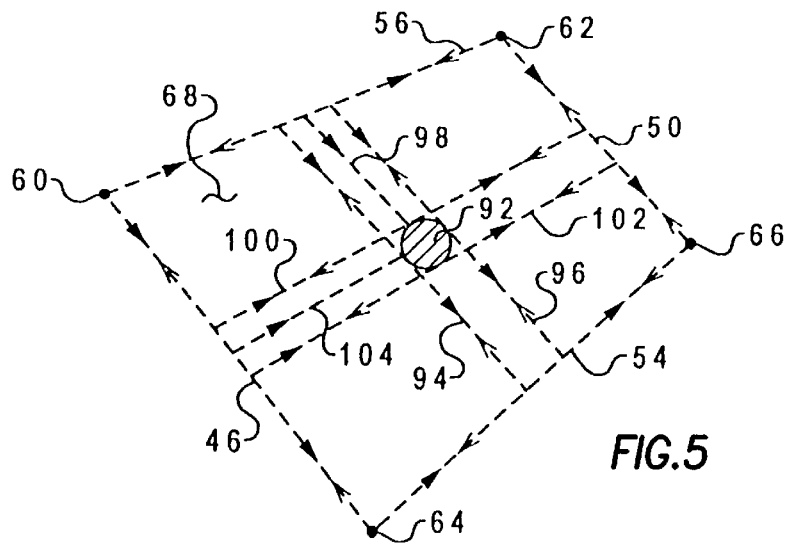
FIG. 5 is an isometric view of a light grid produced by the optical digitizer illustrating obstructed and unobstructed portions of the light grid.

FIG. 5 shows how the location of an obstruction 92 in the light grid 68 is determined. As in the above described figures, filled arrowheads indicate the direction of light beams which have not been reflected off of reflector 70 or 72, while blank arrowheads indicate the direction of beams which have been reflected off of reflector 70 or 72. Note that in FIG. 5, beams 56,50,54, and 46, and points 60,62,64, and 66 correspond to the same beams and points in FIGS. 1, 3, and 4.

Beams 46 and 50, at the outer limits of the horizontal beacon portion 48 are seen to be reflected off of reflector 70. They will be detected, as described above, by the light sensor 74. Likewise, beams 94 and 96, passing just to each side of the obstruction 92 are also reflected back to the light sensor 74. However, beam 98, which strikes the obstruction 92 is not reflected back and, therefore, cannot be detected by the light sensor 74. Note that each of beams 46,50,94,96, and 98 are part of the horizontal beacon portion 48. Thus, the absence of a beam being reflected back from the horizontal beacon portion 48 is detected by the light sensor 74. The center of the horizontal position of the obstruction 92 can be determined by averaging the horizontal positions of beams 94 and 96 which pass just to each side of the obstruction 92.

The vertical portion of the grid 68 operates in the same manner as the horizontal portion. Beams 54 and 56, at the outer limits of the vertical beacon portion 58 are seen to be reflected off of reflector 72. They will be detected, as described above, by the light sensor 74. Likewise, beams 100 and 102, passing just to each side of the obstruction 92 are also reflected back to the light sensor 74. However, beam 104, which strikes the obstruction 92 is not reflected back and, therefore, cannot be detected by the light sensor 74. Note that each of beams 54,56,100,102, and 104 are part of the vertical beacon portion 58. Thus, the absence of a beam being reflected back from the vertical beacon portion 58 is detected by the light sensor 74. The center of the vertical position of the obstruction 92 can be determined by averaging the vertical positions of beams 100 and 102 which pass just to each side of the obstruction 92.

FIGS. 6A through 6E representatively illustrate how the light sensor 74 receives and measures the intensity of the reflected beam 14. The vertical scale in each of FIGS. 6A through 6E is reflected light intensity which the photodiode 76, through leads 78, communicates to the computer. The horizontal scale is time. Traces on these graphs thus indicate a "snapshot" in time of the reflected light intensity "seen" by the light sensor 74.

FIG. 6A representatively illustrates what the light sensor 74 sees when there is no obstruction in the light grid 68. Trace 106 is completely flat (with the exception of small increases in intensity 108 between horizontal and vertical sweeps of the beacon 30), indicating that all of the beam 14 from the horizontal and vertical beacon portions 48,58 is being reflected back off of reflectors 70 and 72.

The small increases in intensity 108 between the horizontal and vertical sweeps are due to the portion of the beacon 30 reflected back to the light sensor 74 by the discriminating reflector 42 in the beacon separator 34. In this manner, the computer can discriminate between a vertical and a horizontal sweep. If, as described above, a nonreflective surface is used to discriminate between horizontal and vertical sweeps of the beacon 30, a decrease, instead of an increase 108, in light intensity would be seen by the light sensor 74.

Note that in FIG. 6A a vertical sweep of the beacon 30 is followed by another vertical sweep and a horizontal sweep is followed by another horizontal sweep. This is due to the fact that the mirror 32 is oscillating. Each sweep is immediately repeated in reverse as the mirror 32 oscillates back and forth. If a rotating polygonal mirror is used instead of an oscillating mirror, a vertical sweep will be followed by a horizontal sweep and a horizontal sweep will be followed by a vertical sweep.

Figure 6B:
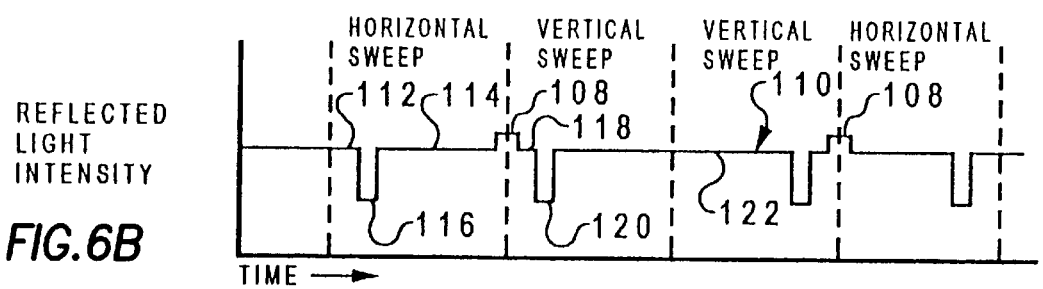
FIG. 6B is a plot of the light reflected when the light grid is obstructed by an object in a first position.

FIG. 6B representatively illustrates a trace 110 produced when there is an obstruction 92 in the light grid 68 near the beginning of both horizontal and vertical sweeps. Referring to FIG. 5, the obstruction 92 would be located near point 60, but still within the light grid 68.

At the beginning of the horizontal sweep, the light intensity represented by trace 110 is the same as trace 106 in the previous FIG. 6A. As the horizontal beacon portion 48 is reflected back to the light sensor 74, between beams 46 and 94, the reflected light intensity remains the same (portion 112 of trace 110). Where the horizontal beacon portion 48 is not reflected back to the light sensor 74, such as beam 98 between beams 94 and 96, the reflected light intensity drops (portion 116 of trace 110). Between beams 96 and 50, when the horizontal beacon portion 48 is again reflected back to the light sensor 74, the reflected light intensity returns to its initial level (portion 114 of trace 110). An increase in light intensity 108 indicates the beginning of the vertical sweep.

As with the horizontal sweep described above, at the beginning of the vertical sweep, the light intensity represented by trace 110 is the same as trace 106. As the vertical beacon portion 58 is reflected back to the light sensor 74, between beams 56 and 100, the reflected light intensity remains the same (portion 118 of trace 110). Where the vertical beacon portion 58 is not reflected back to the light sensor 74, such as beam 104 between beams 100 and 102, the reflected light intensity drops (portion 120 of trace 110). Between beams 102 and 54, when the vertical beacon portion 58 is again reflected back to the light sensor 74, the reflected light intensity returns to its initial level (portion 122 of trace 110). The remainder of trace 110 is the reverse of that described immediately above as the mirror 32 oscillates back to its initial position to begin another sweep of the beacon 30.

Thus, it is seen that a drop in reflected light intensity is seen by the light sensor 74 when an obstruction 92 is encountered in the horizontal and vertical sweeps. The center of the obstruction's position may be calculated by measuring the time from the beginning of the horizontal and vertical sweeps to the centers of the drops in reflected light intensity (portions 116 and 120 of trace 110). The times thus measured correspond to the horizontal and vertical positions of the obstruction 92 in the light grid 68.

The relationship between time and horizontal and vertical position within the light grid 68 will vary, depending on many factors. If, for example, the position of the oscillating mirror 32 varies according to a sinusoidal function, the relationship between time and horizontal and vertical position within the light grid 68 will also be a nonlinear function. If the beams which make up the horizontal or vertical beacon portion 48,58 are not parallel to each other, or if the beacon portions are not orthogonal to each other, the relationship between time and position will be affected accordingly.

Figure 6C:
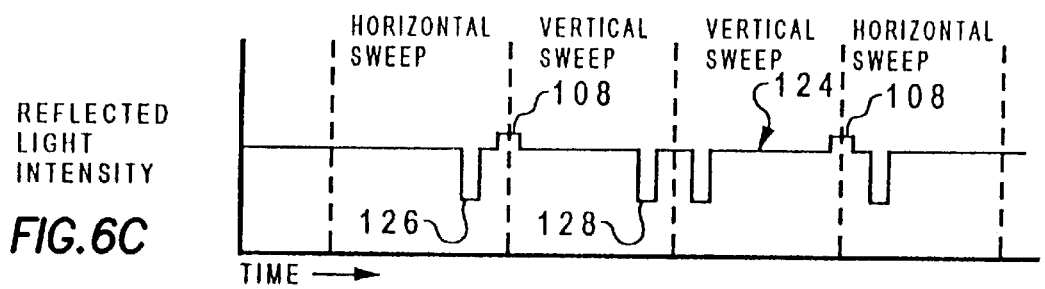
FIG. 6C is a plot of the light reflected when the light grid is obstructed by an object in a second position.

FIG. 6C is similar to FIG. 6B, except that the representatively illustrated portions of a trace 124 indicating a reduced reflected light intensity 126,128 are near the end of the horizontal and vertical sweeps, respectively. Referring to FIG. 5, the trace 124 corresponds to a position of the obstruction 92 near point 66, but still within the light grid 68. Note that, with the obstruction 92 in that position, the unreflected beam 98 in the horizontal beacon portion 48 would be near the end of the horizontal sweep, corresponding to portion 126 of trace 124, and that the unreflected beam 104 in the vertical beacon portion 58 would be near the end of the vertical sweep, corresponding to portion 128 of trace 124.

Figure 6D:
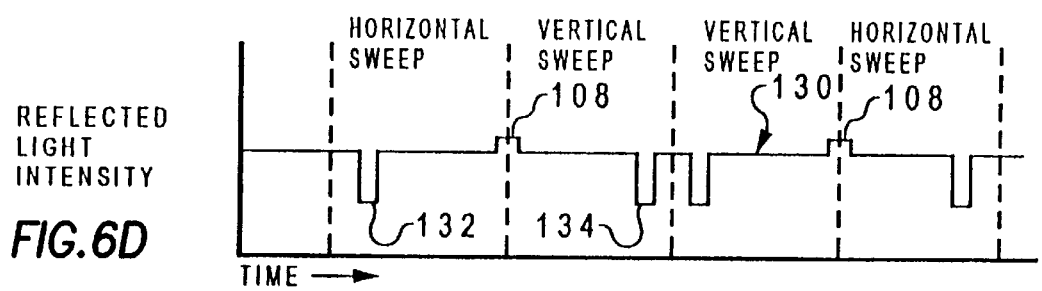
FIG. 6D is a plot of the light reflected when the light grid is obstructed by an object in a third position.

Representatively illustrated in FIG. 6D are portions of a trace 130 having reduced reflected light intensity 132,134 near the beginning of the horizontal sweep and near the end of the vertical sweep of the beacon 30. This corresponds to a position of the obstruction 92 near point 64, but still within the light grid 68 (see FIG. 5).

Figure 6E:
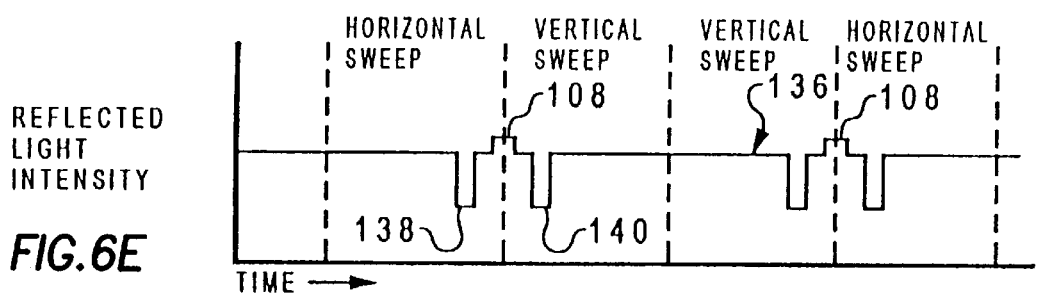
FIG. 6E is a plot of the light reflected when the light grid is obstructed by an object in a fourth position.

Representatively illustrated in FIG. 6E are portions of a trace 136 having reduced reflected light intensity 138,140 near the end of the horizontal sweep and near the beginning of the vertical sweep of the beacon 30. This corresponds to a position of the obstruction 92 near point 62, but still within the light grid 68 (see FIG. 5).

Thus, a person of ordinary skill in the art, given the characteristics of the optical digitizer 10 and the reflected light intensity detected over time by the light sensor 74, is able to determine the position of an obstruction 92 anywhere within the light grid 68.

Up to this point, the optical digitizer 10 has been described without regard to the relationship between a plane across which the horizontal beacon portion 48 is swept and a plane across which the vertical beacon 58 portion is swept. FIGS. 1, 3, and 5 illustrate embodiments in which the above described planes are coplanar. If, however, the planes are not coplanar, the optical digitizer 10 functions as described hereinabove, but the obstruction 92 is then permitted to obstruct one of the beacon portions 48,58 without obstructing the other. It is then possible to perform other functions, for example, measure the velocity of the obstruction 92 by dividing the distance separating the planes swept by the horizontal and vertical beacon portions 48,58 by the difference in time between when the light sensor 74 sees a reduced reflected light intensity in each sweep.

It is also possible to determine the position of an obstruction in more or less than two dimensions using the principles of the present invention. If only one spatial dimension is desired, then only one beacon portion is needed. If three spatial dimensions are desired, more than one optical digitizer 10 may be stacked to form a three-dimensional light grid.

Figure 7:
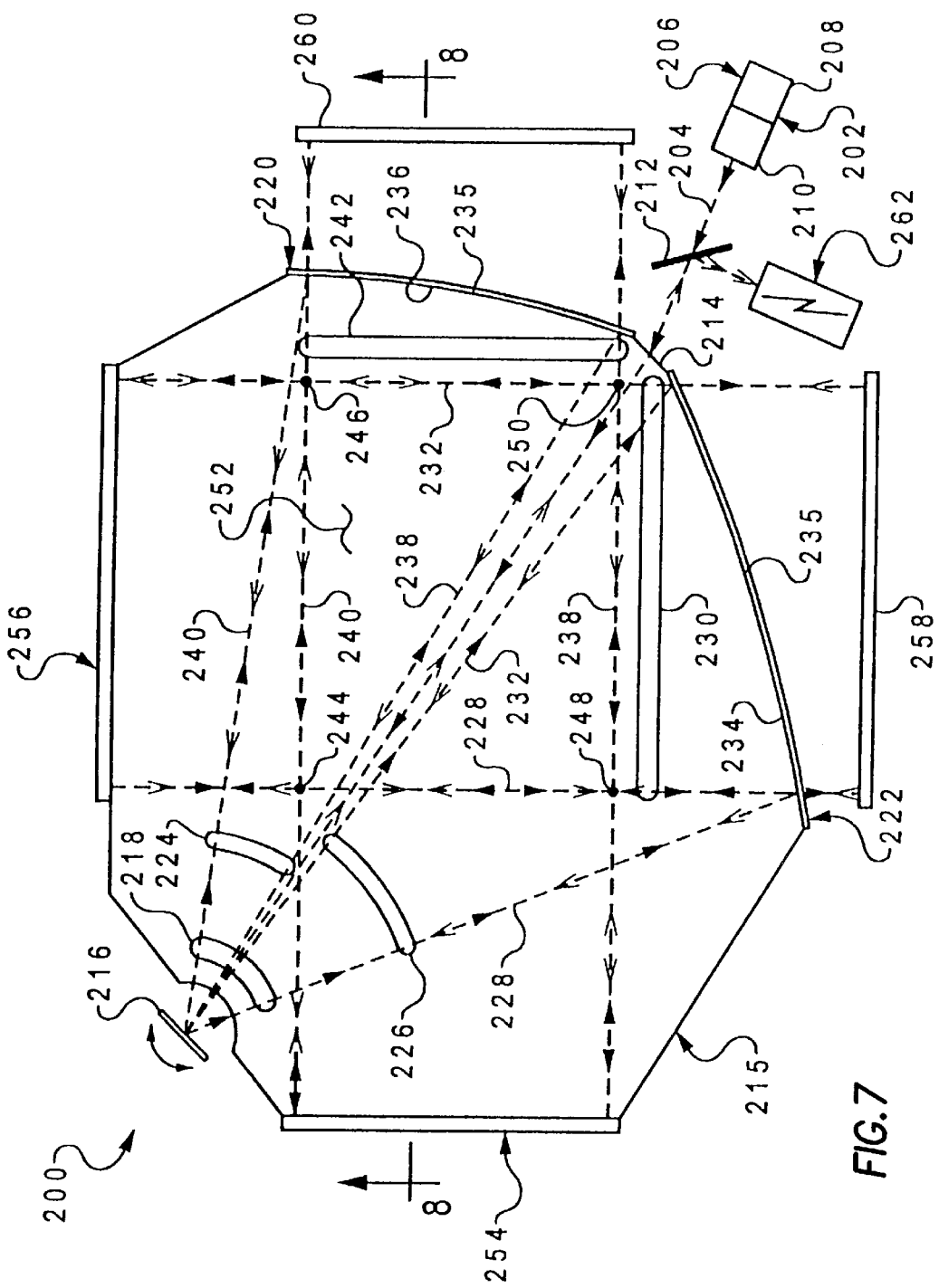
FIG. 7 is a schematic representation of another optical digitizer embodying principles of the present invention.

Illustrated in FIG. 7 is another embodiment of an optical digitizer 200. It is shown in highly schematicized form for the purpose of clarity. Dashed lines and arrows are used to represent paths and directions, respectively, of light. Filled arrowheads represent directions of unreflected light and unfilled arrowheads represent directions of reflected light in a manner similar to that used in FIGS. 1, 3, 4, and 5. In the optical digitizer 200 illustrated in FIG. 7, however, light is reflected in more than one plane.

A light source 202 provides a compact beam of light 204 which is in the infrared portion of the light spectrum in the illustrated embodiment. The light source 202 includes a laser 206 which, in turn, includes a light emitting diode 208 and a collimator 210. The light emitting diode 208 produces infrared light. The infrared light produced by the light emitting diode 208 is made into the beam 204 having essentially parallel sides by the collimator 210.

The beam 204 next passes through a half-silvered mirror 212 which passes half of the beam 204 and reflects the other half. The reflected half of the beam 204 is not used in the illustrated embodiment, so it is not shown in FIG. 7. The half-silvered mirror 212 performs essentially the same function in the optical digitizer 200 representatively illustrated in FIG. 7 as the half-silvered mirror 26 in the beam splitter 24 illustrated in FIG. 1.

The beam 204 next passes through a refracting surface 214 and into a substantially transparent and planar lightguide 215. The lightguide 215 has a refractive index different than that of air, such that the beam 204 changes direction as it passes through the refracting surface 214. The material of which the lightguide 215 is constructed is clear plastic, although other materials, for example, glass, may be used. The purpose of the refracting surface 214 in the illustrated optical digitizer 200 is to enhance packaging, i.e., to permit the light source 202, half-silvered mirror 212, etc., to be positioned for optimum compactness.

The beam 204 next passes through the lightguide 215 to an oscillating mirror 216. The beam 204 reflects off of the oscillating mirror 216, producing a beacon 218. The beacon 218 differs from the beam 204 in that the beacon 218 "sweeps" across a plane, whereas the beam 204 remains stationary. In other words, the beacon 218 is the beam 204 put into motion by the oscillating mirror 216.

It is to be understood that the beacon 218 may be generated from the beam 204 by other methods as well. For example, instead of the oscillating mirror 216, a rotating polygonal mirror could be used to repeatedly and sequentially sweep beam 204 across an area. As a further example, beam 204 could be directed across a curved surface instead of a flat plane.

The beacon 218 is directed by the oscillating mirror 216 to sweep across two parabolic mirrors formed on edges of the lightguide 215, one of which 220 is oriented generally vertical as viewed in FIG. 7, and the other of which 222 is oriented generally horizontal as viewed in FIG. 7. A portion of the beacon 218, the "vertical" component 224 sweeps across the vertical parabolic mirror 220. Likewise, a "horizontal" beacon component 226 sweeps across the horizontal parabolic mirror 222. In a manner that will be readily appreciated by one of ordinary skill in the art, and which is described more fully hereinbelow, the horizontal component 226 and horizontal parabolic mirror 222 are utilized to determine an object's horizontal position within a light grid, and the vertical component 224 and vertical parabolic mirror 220 are utilized to determine the object's vertical position within the light grid.

The horizontal parabolic mirror 222 in the illustrated optical digitizer 200 has a smooth upwardly facing surface 234 with reflective material 235, such as silver, applied thereto. The upwardly facing surface 234 has a parabolic shape so that the radially-directed horizontal component 226, once reflected off of the upwardly facing surface 234 will sweep horizontally as a beacon having parallel sides. The vertical parabolic mirror is similarly constructed so that the radially directed vertical component 224, once reflected off of leftwardly facing surface 236, will sweep vertically as a beacon having parallel sides.

When the horizontal component 226 reflects off of the horizontal parabolic mirror 222, it is directed in an upward direction as viewed in FIG. 7. Thus, it can be seen that as the horizontal component 226 of the beacon 218 sweeps across the upwardly facing surface 234 of horizontal parabolic mirror 222, it is made to sweep horizontally from side to side as viewed in FIG. 7. The lowermost limit of the horizontal component 226, illustrated as a beam 228, once reflected off of the horizontal parabolic mirror 222, becomes the leftmost limit of a horizontal beacon portion 230 as viewed in FIG. 7. The uppermost limit of the horizontal component 226, illustrated as a beam 232, once reflected off of the horizontal parabolic mirror 222, becomes the rightmost limit of the horizontal beacon portion 230 as viewed in FIG. 7. Therefore, the horizontal beacon portion 230 is nothing more than the horizontal component 226 of the beacon 218 reflected off of the horizontal parabolic mirror 222.

In FIG. 7, it can be seen that beam 228 strikes the horizontal parabolic mirror 222 at a slightly different angle than does beam 232, however, once reflected off of horizontal parabolic mirror 222, beams 228 and 232 are parallel in the horizontal beacon portion 230. It is to be understood that, in carrying out the principles of the present invention, the horizontal parabolic mirror 222 does not have to be an integral portion of lightguide 215 or be silver-coated, and that beams 228 and 232 do not have to be parallel in the horizontal beacon portion 230. The horizontal parabolic mirror 222 could have a shape other than parabolic.

Vertical component 224 of the beacon 218, after reflecting off the oscillating mirror 216, strikes the vertical parabolic mirror 220 which is constructed in a manner similar to the horizontal parabolic mirror 222 in the illustrated embodiment. A beam 238, lowermost in the vertical component 224 as illustrated in FIG. 7, strikes the vertical parabolic mirror 220 and is reflected to the left in a direction orthogonal to the horizontal beacon portion 230. A beam 240, uppermost in the vertical component 224, strikes the vertical parabolic mirror 220 and is also directed to the left, orthogonal to horizontal beacon portion 230 as illustrated in FIG. 7. Thus, it can be seen that vertical component 224 of the beacon 218 is reflected off of vertical parabolic mirror 220 so that it sweeps vertically, as illustrated in FIG. 7, between the representatively shown beams 238 and 240, forming a vertical beacon portion 242 which is orthogonal to horizontal beacon portion 230. Note that, as with horizontal parabolic mirror 222 described above, vertical parabolic mirror 220 could have a different shape and could be made of other materials.

Since beam 204 is continuously directed to the oscillating mirror 216, the resulting beacon 218 is also continuous. Therefore, although beams 228 and 232 are illustrated as being at the outer limits of horizontal beacon portion 230, and beams 238 and 240 are illustrated as being at the outer limits of vertical beacon portion 242, it is important to understand that the beam 204, in the form of the vertical or horizontal beacon portion 230,242 sweeps continuously between these outer limits. Note, however, that at any one instant in the illustrated embodiment, beam 204 may be directed to the horizontal beacon portion 230 or vertical beacon portion 242, but not both.

It is also important to note at this point that although separate beams 228,232,238,240 are referred to in this description of the illustrated embodiment, no two of these are present at one time, since they all emanate from the same beam 204 produced by the light source 202. Beams 228, 232,238,240 representatively illustrated in FIG. 7 are all simply different positions of beam 204. Likewise, different beacon portions 230,242 and beacon components 224,226 are just parts of beacon 218, which is, in turn, made up of different positions of beam 204 produced by the oscillating mirror 216.

Beam 240 intersects beam 228 at point 244 and intersects beam 232 at point 246. Beam 238 intersects beam 228 at point 248 and intersects beam 232 at point 250. Since the horizontal beacon portion 230 is orthogonal to the vertical beacon portion 242, points 244, 246, 248, and 250 define the corners of a rectangular light grid 252. In this light grid 252, the horizontal beacon portion 230 sweeps from side to side, and the vertical beacon portion 242 sweeps from top to bottom, as representatively illustrated in FIG. 7. For the purpose of further description of the illustrated embodiment, the defined beginning of the sweep of the horizontal beacon portion 230 shall be at its leftmost limit (beam 228 as illustrated in FIG. 7), and the defined beginning of the sweep of the vertical beacon portion 242 shall be at its lower limit (beam 238 as illustrated in FIG. 7).

It is to be understood that the light grid 252 could have a shape other than rectangular. If, as described above, beams 228 and 232 are not parallel to each other, a trapezoid shape is produced. If, additionally, beams 240 and 238 are not parallel to each other, another polygonal shape is produced. Light grid 252 may take virtually any shape as long as no beam in the horizontal beacon portion 230 is collinear with a beam in the vertical beacon portion 242.

In a unique manner more fully described hereinbelow, the horizontal and vertical beacon portions 230 and 242, and the light grid 252 defined thereby, are "transposed", that is, transferred to another plane, different from a plane in which the components of the optical digitizer 200 heretofore described lie. Thus, the light source 202, half-silvered mirror 212, lightguide 215, oscillating mirror 216, horizontal parabolic mirror 222, and vertical parabolic mirror 220 all lie in a plane as representatively illustrated in FIG. 7. The light beam 204 and some of its permutations (vertical portion 242, horizontal portion 230, and light grid 252), however, coexist on another, transposed, plane.

This transposition is accomplished by means of two light pipes, a vertical light pipe 254 which transposes the vertical beacon portion 242, and which is generally vertically oriented as shown in FIG. 7, and a horizontal light pipe 256 which transposes the horizontal beacon portion 230, and which is generally horizontally oriented as shown in FIG. 7. Vertical light pipe 254 takes the leftwardly directed vertical beacon portion 242, transposes it, and directs it to the right as viewed in FIG. 7. Horizontal light pipe 256 takes the upwardly directed horizontal beacon portion 230, transposes it, and directs it downward as viewed in FIG. 7. Light pipes 254 and 256 are described more fully below in the detailed description accompanying FIG. 8.

After the horizontal beacon portion 230 has been transposed and directed downward by the horizontal light pipe 256, as described above, reflector 258, representatively illustrated in FIG. 7 as being horizontally disposed at the lowermost extent of horizontal beacon portion 230, reflects the horizontal beacon portion 230 directly back in the direction of horizontal light pipe 256 and thence downwardly back to horizontal parabolic mirror 222. Unfilled arrowheads on beams representatively illustrated in horizontal beacon portion 230 indicate the direction of beams which have reflected off of reflector 258. Thus, beams in the horizontal beacon portion 230 are reflected from the horizontal light pipe 256 back through the lightguide 215 to horizontal parabolic mirror 222, through the lightguide 215 again to the oscillating mirror 216, through the lightguide 215 yet again, and thence to the half-silvered mirror 212.

In a similar manner, reflector 260, representatively illustrated in FIG. 7 as being vertically disposed at the right-hand edge of vertical beacon portion 242, reflects the vertical beacon portion 242 directly back in the direction of vertical light pipe 254, through the lightguide 215, and thence back to vertical parabolic mirror 220. Unfilled arrowheads on beams representatively illustrated in vertical beacon portion 242 indicate the direction of beams which have reflected off of reflector 260. Thus, beams in the vertical beacon portion 242 are reflected back through the lightguide 215 to vertical parabolic mirror 220, through the lightguide 215 again to the oscillating mirror 216, through the lightguide 215 yet again, and thence to the half-silvered mirror 212.

Reflectors 258 and 260, in the illustrated embodiment, are made of a material which reflects light back in the same direction at which it initially strikes the material. It is known to those skilled in the art as retro-reflecting film. There are several types of retro-reflecting film, including micro corner cube and micro sphere. The micro corner cube type has been found to give acceptable results in the illustrated embodiment apparatus.

In the illustrated embodiment, with no obstruction blocking the path of any beam, the cumulative total of the beams reflected back from the horizontal and vertical beacon portions 230,242 is continuous and equal to the beam 204 which leaves the half-silvered mirror 212, with the exception of the portion which strikes the refractive surface 214 between the horizontal and vertical parabolic mirrors 220, 222. Thus, referring to FIGS. 6A–6E, the increased reflected light intensity portion 108 between successive vertical and horizontal sweeps, corresponds to that portion of beacon 218 which is directed back through the refractive surface 214 between beacon portions 224 and 226. It is to be understood, however, that as beam 204 is reflected off of various surfaces and passes through various components of the illustrated embodiment, transmission errors and various inefficiencies in reflecting the beam 204 will result in a loss in light intensity by the time it is reflected back to the half-silvered mirror 212. As with the previously described and illustrated optical digitizer 10, other methods of discriminating between horizontal and vertical sweeps may be utilized as well.

The reflected beam 204, representatively illustrated in FIG. 7 having an unfilled arrowhead, is reflected back off of the oscillating mirror 216, back through the lightguide 215, and strikes the half-silvered mirror 212. A portion of the reflected beam 204 is directed to a photodiode 262 in the path of the reflected beam 204, which is capable of measuring the beam's intensity. Other methods of measuring the beam's intensity may also be used. Use of the apparatus illustrated in FIG. 7, and the resulting measurements of the intensity of the reflected beam 204 over time (see FIGS. 6A–6E), allow the position of an object in the light grid 252 to be determined as described hereinabove.

Turning now to FIG. 8, a cross-sectional view of the optical digitizer 200 representatively illustrated in FIG. 7 is shown. For the purpose of clarity, only one representative beam 240 is shown in this view. The path of this beam 240 will be described below so that a complete understanding may be had of the manner in which the light grid 252 (see FIG. 7) is vertically transposed.

Beam 240 originates at the oscillating mirror 216 when beam 204 (see FIG. 7) strikes the oscillating mirror 216 while it is directed toward the vertical parabolic mirror 220. At this point, beam 240 is a portion of the vertical beacon component 224 (see FIG. 7). Beam 240 leaves the oscillating mirror 216, travels through the lightguide 215, strikes the vertical parabolic mirror 220, and is reflected back through the lightguide 215. At this point, beam 240 is a portion of the vertical beacon portion 242 (see FIG. 7).

After being reflected off of the vertical parabolic mirror 220 and traveling through lightguide 215, beam 240 enters the vertical light pipe 254. The beam 240 first strikes and is reflected off of a right angle reflector 264. The right angle reflector 264 directs the beam 240 vertically upward as viewed in FIG. 8. Right angle reflector 264 may be constructed of any suitable material, such as a conventional mirror, capable of reflecting the beam 240. The material of which the right angle reflector 264 is made is silver-coated clear plastic.

Beam 240 travels upwardly after being reflected off of the right angle reflector 264 and strikes a reflector 266. Reflector 266 directs the beam 240 horizontally to the right as viewed in FIG. 8. Reflector 266 is constructed using a material commonly known to those skilled in the art as right-angle film. Right-angle film reflects light back at a ninety degree included angle and is available from the 3M Corporation.

Beam 240 leaves reflector 266 and travels to the right as viewed in FIG. 8, and passes in front of the horizontal light pipe 256, which is constructed in a manner similar to the vertical light pipe 254 described above. As also described above, the horizontal beacon portion 230 (see FIG. 7) is transposed and, as representatively illustrated, intersects the vertically transposed vertical beacon portion 242 (see FIG. 7).

As beam 240 passes in front of the horizontal light pipe 256, it intersects beam 228 (see FIG. 7) at point 244, at a corner of the light grid 252 (see FIG. 7). Likewise, beam 240 intersects beam 232 (see FIG. 7) at point 246, at another corner of the light grid 252. The beam 240 continues traveling to the right until it strikes vertical reflector 260.

Beam 240 reflects off of reflector 260 and is directed horizontally to the left as viewed in FIG. 8. From this point, unless interrupted by an object in its path, beam 240 retraces its path and is vertically transposed back down into the lightguide 215 by the vertical light pipe 254. Unfilled arrowheads indicate the direction of the beam 240 after it has been reflected off of reflector 260.

After being reflected back into the lightguide 215, the beam 240 reflects off the vertical parabolic mirror 220 and is directed back through the lightguide 215 to the oscillating mirror 216, and thence back through the light guide 215, the refracting surface 214 (see FIG. 7), and to the half-silvered mirror 212 as described above.

Shown in FIG. 9 is a partially cut away keyboard 280. The keyboard 280 takes advantage of the vertical transposition of the light grid 252 by the optical digitizer 200 described above, to position the light grid 252 above keys 282 disposed on the keyboard 280.

Keyboard 280 has a housing 284 which supports a keypad 286. The keys 282 are distributed about the keypad 286 and include a space bar 288. Beneath the keypad 286, components of the optical digitizer 200 (more completely described hereinabove and representatively illustrated in FIGS. 7 and 8), including the light source 202, half-silvered mirror 212, photodiode 262, lightguide 215, horizontal and vertical parabolic mirrors 222,220, and oscillating mirror 216, are contained within the keyboard housing 284.

Horizontal and vertical light pipes 256 and 254 vertically transpose the light grid 252 so that it is disposed above the keys 282. In this manner, a user may utilize a finger or other object to interrupt the light grid 252 above the keys 282 in order to indicate a position on a computer screen as more fully described hereinabove. It is to be understood that the light grid 252 may also be otherwise utilized in apparatus other than a keyboard.

Horizontal reflector 258 is attached to the space bar 288, facing the horizontal light pipe 256, similar to the manner in which reflector 70 is attached to space bar 88 in optical digitizer 10 representatively illustrated in FIG. 3. Horizontal and vertical light pipes 256 and 254 extend through the keypad 286 so that the light grid 252 is vertically transposed above the keys 282. In this configuration, referring also to FIG. 8, the keypad 286 is disposed vertically between the right angle reflector 264 and reflector 266 of the vertical light pipe 254.

It is to be understood that the light pipes 254 and 256 may be otherwise constructed and mounted to the keypad 256. For example, the light pipes may be constructed so that they telescope into and out of the keypad 256. In this manner, the keyboard 280 may be made to more compactly nest against a computer screen for compact storage.

Figure 10:
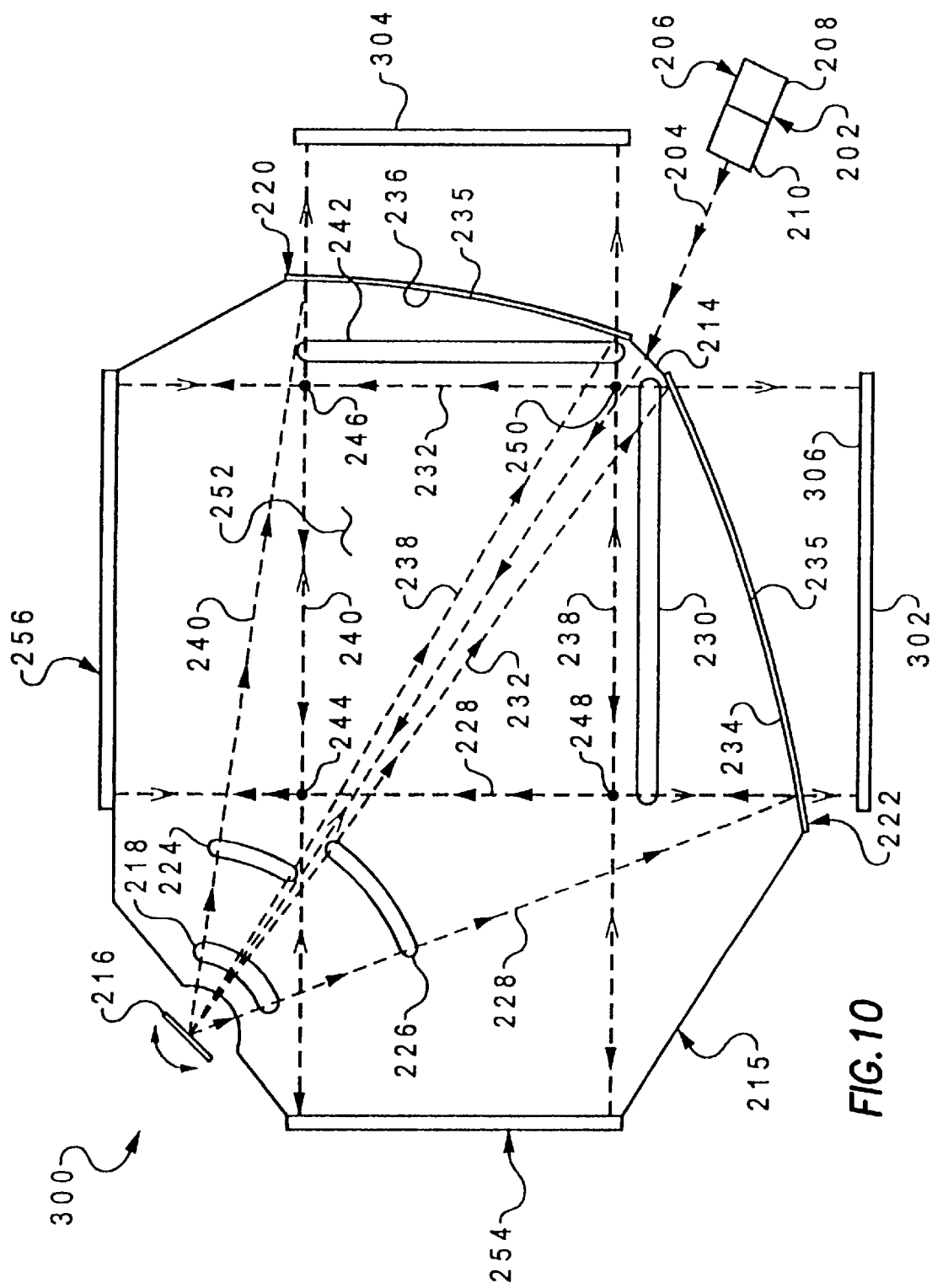
FIG. 10 is a schematic representation of yet another optical digitizer.

Illustrated in FIG. 10 is another embodiment of an optical digitizer 300. It is shown in highly schematicized form for the purpose of clarity. Dashed lines and arrows are used to represent paths and directions, respectively, of light. Filled arrowheads represent directions of light in one plane and unfilled arrowheads represent directions of light that has been transposed to another plane in a manner that will become clear upon consideration of the detailed description hereinbelow.

In the optical digitizer 300 illustrated in FIG. 10, similar to the optical digitizer 200 illustrated in FIG. 7, light is reflected in more than one plane. Elements of the optical digitizer 300 representatively illustrated in FIG. 10, which have substantially the same function and structure as elements representatively illustrated in FIG. 7, have been identified in FIG. 10 with the same item numbers, and are not further described hereinbelow, unless such further description is helpful to fully and completely describe the optical digitizer 300.

A light source 202 provides a compact beam of light 204 which is in the infrared portion of the light spectrum. The beam 204 next passes through a refracting surface 214 and into substantially transparent lightguide 215. Note that optical digitizer 300 as representatively illustrated does not include a beam splitter or half-silvered mirror. The beam 204 next passes to an oscillating mirror 216. The beam 204 reflects off of the oscillating mirror 216, producing a beacon 218.

The beacon 218 is directed by the oscillating mirror 216 to sweep across two parabolic mirrors, one of which 220 is oriented generally vertical as viewed in FIG. 10, and the other of which 222 is oriented generally horizontal as viewed in FIG. 10. A portion of the beacon 218, the "vertical" component 224 sweeps across the vertical parabolic mirror 220. Likewise, a "horizontal" beacon component 226 sweeps across the horizontal parabolic mirror 222.

When the horizontal component 226 reflects off of the horizontal parabolic mirror 222, it is directed in an upward direction as viewed in FIG. 10. The lowermost limit of the horizontal component 226, illustrated as a beam 228, once reflected off of the horizontal parabolic mirror 222, becomes the leftmost limit of a horizontal beacon portion 230 as viewed in FIG. 10. The uppermost limit of the horizontal component 226, illustrated as a beam 232, once reflected off of the horizontal parabolic mirror 222, becomes the rightmost limit of the horizontal beacon portion 230 as viewed in FIG. 10.

Vertical component 224 of the beacon 218, after reflecting off of the oscillating mirror 216, strikes the vertical parabolic mirror 220 which is constructed in a manner similar to the horizontal parabolic mirror 222 in the illustrated embodiment. A beam 238, lowermost in the vertical component 224 as illustrated in FIG. 10, strikes the vertical parabolic mirror 220 and is reflected to the left in a direction orthogonal to the horizontal beacon portion 230. A beam 240, uppermost in the vertical component 224, strikes the vertical parabolic mirror 220 and is also directed to the left, orthogonal to horizontal beacon portion 230 as illustrated in FIG. 10. Thus, it can be seen that vertical component 224 of the beacon 218 is reflected off of vertical parabolic mirror 220 so that it sweeps vertically, as illustrated in FIG. 10, between the representatively shown beams 238 and 240, forming a vertical beacon portion 242 which is orthogonal to horizontal beacon portion 230.

Beam 240 intersects beam 228 at point 244 and intersects beam 232 at point 246. Beam 238 intersects beam 228 at point 248 and intersects beam 232 at point 250. Since the horizontal beacon portion 230 is orthogonal to the vertical beacon portion 242, points 244, 246, 248, and 250 define the corners of a rectangular light grid 252. In this light grid 252, the horizontal beacon portion 230 sweeps from side to side, and the vertical beacon portion 242 sweeps from top to bottom, as representatively illustrated in FIG. 10.

In a unique manner more fully described hereinbelow, the horizontal and vertical beacon portions 230 and 242, and the light grid 252 defined thereby are transferred to another plane, different from a plane in which the components of the optical digitizer 300 heretofore described lie. Thus, the light source 202, lightguide 215, oscillating mirror 216, horizontal parabolic mirror 222, and vertical parabolic mirror 220 all lie in a plane as representatively illustrated in FIG. 10. The light beam 204 and some of its permutations (vertical portion 242, horizontal portion 230, and light grid 252), however, coexist on another, transposed, plane.

This transposition is accomplished by means of two light pipes, a vertical light pipe 254 which vertically transposes the vertical beacon portion 242 and is generally vertically oriented as shown in FIG. 10, and a horizontal light pipe 256 which vertically transposes the horizontal beacon portion 230 and is generally horizontally oriented as shown in FIG. 10. Vertical light pipe 254 takes the leftwardly directed vertical beacon portion 242, transposes it, and directs it to the right as viewed in FIG. 10. Horizontal light pipe 256 takes the upwardly directed horizontal beacon portion 230, transposes it, and directs it downward as viewed in FIG. 10. Light pipes 254 and 256 are described more fully above in the detailed description accompanying FIG. 8. Directions of beams which have been transposed are indicated in FIG. 10 with unfilled arrowheads.

After the horizontal beacon portion 230 has been transposed and directed downward by the horizontal light pipe 256, as described above, a conventional linear detector 302, representatively illustrated in FIG. 10 as being horizontally disposed at the lowermost extent of horizontal beacon portion 230, senses light intensity along its length. The linear detector 302 is of the type that is capable of indicating the light intensity of a beam which strikes anywhere on its upwardly facing (as viewed in FIG. 10) surface 306. In a similar manner, conventional linear detector 304, representatively illustrated in FIG. 10 as being vertically disposed at the right-hand edge of vertical beacon portion 242, senses the light intensity along its length of the beam 204 in the vertical beacon portion 242.

Plotting the light intensity over time as sensed by the horizontal and vertical linear detectors 302,304 will yield plots which are substantially the same as those representatively illustrated in FIGS. 6A–6E, with the exception that the vertical and horizontal sweeps will be separated, because they are sensed by separate linear detectors 302,304, and there will be no increase in light intensity 108 between the horizontal and vertical sweeps. Note that there is no need to discriminate between horizontal and vertical sweeps since these are sensed by separate detectors 302,304.

Other methods of measuring the beam's horizontal and vertical position may also be used. Use of the apparatus 300 illustrated in FIG. 10, and the resulting measurements of the intensity of the beam 204 over time (see FIGS. 6A–6E), allow the position of an object in the light grid 252 to be determined as described hereinabove.

It will be readily apparent to one of ordinary skill in the art that the light grid 252 of the optical digitizer 300 representatively illustrated in FIG. 10 may be disposed overlying a keyboard, and the light source 202, lightguide 215, oscillating mirror 216, and horizontal and vertical parabolic mirrors 222 and 220 may be disposed beneath the keyboard as with the optical digitizer 200 representatively illustrated in FIG. 9. If such an arrangement is desired, horizontal linear detector 302 can be substituted for the reflector 258 on the space bar, and vertical linear detector 304 can be substituted for the reflector 260 to the right of the keys as representatively illustrated in FIG. 9.

Figure 11:
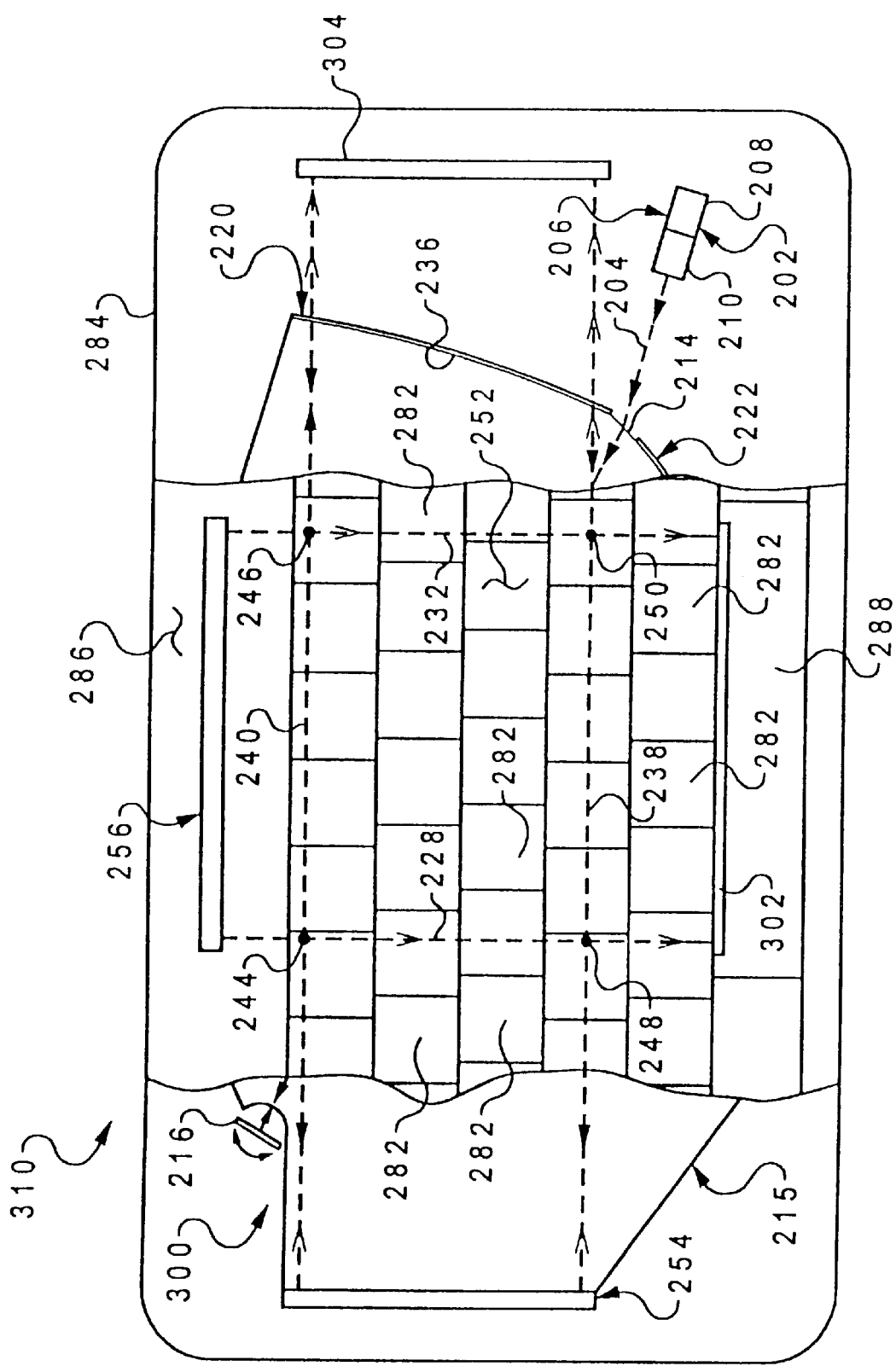
FIG. 11 is a top plan view of a partially cut away computer keyboard having the optical digitizer of FIG. 10 thereon.

Shown in FIG. 11 is a keyboard 310. The keyboard 310 takes advantage of the vertical transposition of the light grid 252 by the optical digitizer 300 described above, to position the light grid 252 above keys 282 disposed on the keyboard 310, in a manner similar to the keyboard 280 representatively illustrated in FIG. 9. In the keyboard 310 illustrated in FIG. 11, however, the optical digitizer 300 is substituted for the optical digitizer 200. Elements of keyboard 310 that are substantially similar in function and structure are identified with the same item numbers in FIG. 11 as in FIG. 9.

Keyboard 310 has a housing 284 which supports a keypad 286. The keys 282 are distributed about the keypad 286 and include a space bar 288. Beneath the keypad 286, components of the optical digitizer 300 (more completely described hereinabove and representatively illustrated in FIG. 10), including the light source 202, lightguide 215, horizontal and vertical parabolic mirrors 222, 220, and oscillating mirror 216, are contained within the keyboard housing 284.

Horizontal and vertical light pipes 256 and 254 vertically transpose the light grid 252 so that it is disposed above the keys 282. In this manner, a user may utilize a finger or other object to interrupt the light grid 252 above the keys 282 in order to indicate a position on a computer screen as more fully described hereinabove. It is to be understood that the light grid 252 may be utilized in an apparatus other than a keyboard 310.

Horizontal linear detector 302 is attached to the space bar 288, facing the horizontal light pipe 256, similar to the manner in which horizontal reflector 258 is attached to space bar 288 in optical digitizer 200 representatively illustrated in FIG. 9. Horizontal and vertical light pipes 256 and 254 extend through the keypad 286 so that the light grid 252 is vertically transposed above the keys 282.

It is to be understood that the light grid 252 may be positioned relative to other structures, such as a flat planar surface or a curved surface. It is also to be understood that light grid 252 may be in more than one plane above the keypad 286, the vertical and horizontal beacon portions 230 and 242 (see FIG. 10) being vertically transposed by the light pipes 254 and 256 to different planes above the keypad 286, enabling the velocity of an object obstructing the transposed beacon portions 230 and 242 to be calculated as more fully described hereinabove.

Figure 12:
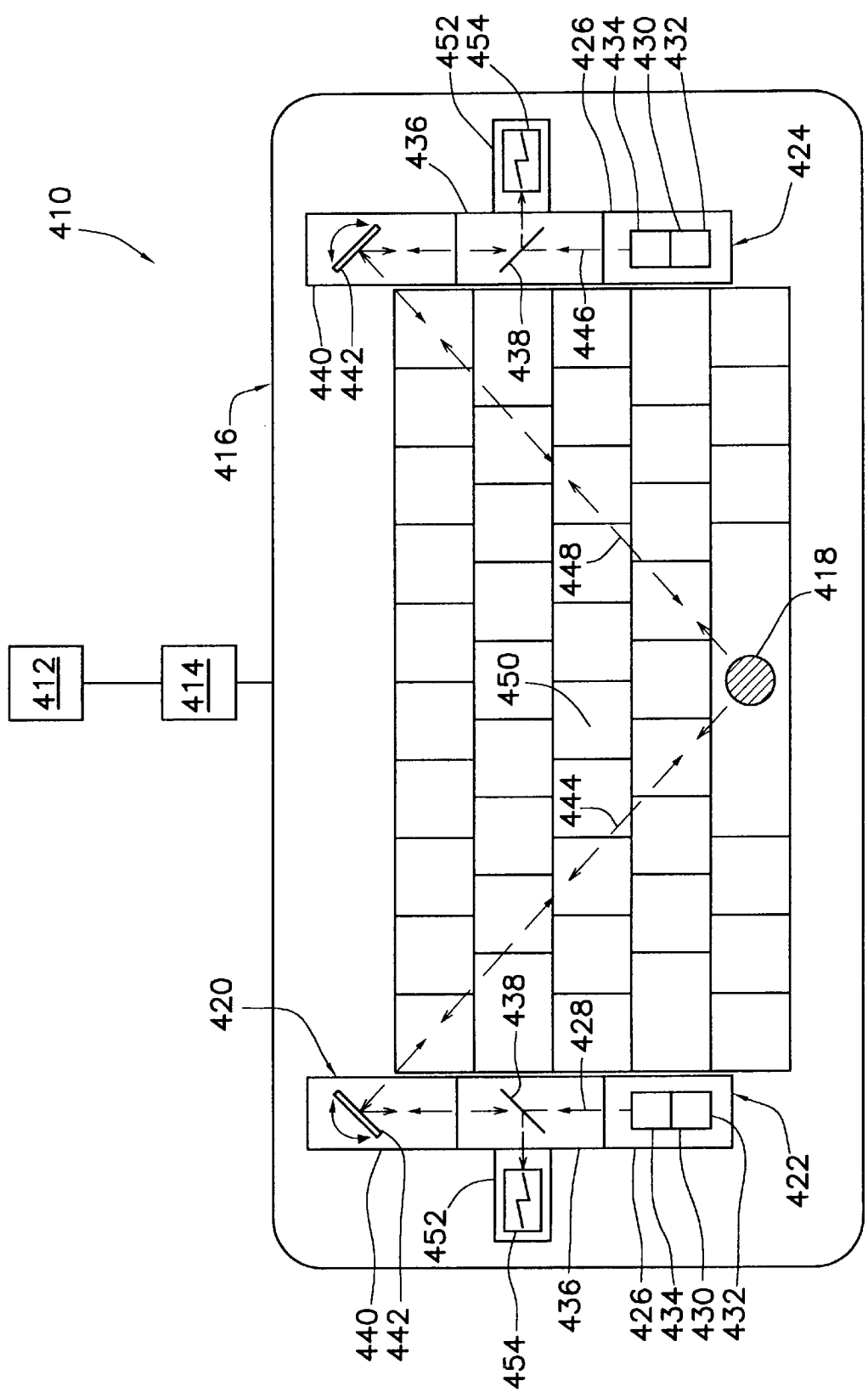
FIG. 12 is a top plan view of a computer keyboard of a computer system, the computer keyboard having still another optical digitizer embodying principles of the present invention disposed thereon.

Referring additionally now to FIG. 12, a computer system 410 embodying principles of the present invention is representatively illustrated. The computer system 410 is shown in highly schematicized form for illustrative clarity. Included in the computer system 410 are a monitor 412, a central processing unit (CPU) 414 interconnected to the monitor 412, and an apparatus, representatively a keyboard 416, interconnected to the CPU. As will be more fully described hereinbelow, the keyboard 416 includes features which uniquely permit the position of an object 418, such as a finger, stylus, pencil, etc., to be determined and communicated to the CPU.

For determining the object's position, the keyboard 416 includes an optical digitizer 420 disposed thereon. The optical digitizer 420 includes several elements which are representatively illustrated in FIG. 12 as discreet components mounted to an upper surface of the keyboard 416. However, it is to be clearly understood that one or more of the elements of the optical digitizer 420 may be mounted below the keyboard 416 upper surface, for example, in a manner similar to the manner in which portions of the optical digitizer 300 are mounted as shown in FIG. 11, and that one or more of the elements may be compactly packaged, for example, so that they are not distributed across large areas of the keyboard, without departing from the principles of the present invention.

In the optical digitizer 420 representatively illustrated in FIG. 12, the object 418 reflects back a portion of each of two beacons to a pair of corresponding light sensors, these reflections are sensed by the sensors, and the object's position is determined by conventional triangulation techniques. Thus, the optical digitizer 420 differs in one respect from the other optical digitizers described hereinabove in that the object 418 is utilized to reflect light back to one or more sensors, instead of being utilized to obstruct reflections of light back to one or more sensors. Of course, it will be readily appreciated by one of ordinary skill in the art that an object obstructing one or more of the light beacons in the previously described optical digitizers will in fact reflect some light (albeit at a diminished intensity as representatively illustrated in FIGS. 6B–6E) back to one or more of the sensors.

In FIG. 12, dashed lines and arrows are used to represent paths and directions, respectively, of light. Filled arrowheads represent directions of light beams which have not yet been reflected off of the object 418, and unfilled arrowheads represent directions of light beams which have been reflected off of the object.

The optical digitizer 420 includes two beacon-producing and light-sensing modules 422, 424, each of which is made up of similar elements. Therefore, only one of the modules 422, 424 will be described herein. However, it is to be clearly understood that it is not necessary for the modules 422, 424 to be similarly configured, or for the modules to include similar elements, in the optical digitizer 420.

The module 422 includes a light source 426 for producing a compact beam of light 428. The light beam 428 is in the infrared portion of the light spectrum, but it is to be understood that the light beam may have other wavelengths without departing from the principles of the present invention. The light source 426 includes a laser 430 which, in turn, includes a light emitting diode 432 and a collimator 434. The light emitting diode 432 produces infrared light, which is made into the beam 428 having essentially parallel sides by the collimator 434. As an alternative, a conventional non-coherent light emitting diode (not shown) or other light source could be used in place of the laser 430.

The beam 428 next passes into a beam splitter 436. The beam splitter 436 includes a half-silvered mirror 438, which passes half of the beam 428 and reflects the other half. The reflected half of the beam 428 is not used in the module 422, so it is not shown in FIG. 12. However, in an alternate embodiment of the present invention, the reflected half of the beam 428 may be utilized in the other module 424, so that another light source 426 is not needed.

The beam 428 next passes into a beacon generator 440. The beacon generator 440 produces a beacon 444 from the beam 428 by reflecting the beam off of an oscillating mirror 442. For illustrative clarity, only one portion of the beacon 444 is representatively illustrated in FIG. 12 (specifically, that portion of the beacon which strikes the object 418), but it is to be understood that the beacon actually sweeps across a plane above the upper surface of the keyboard 416. Thus, the beacon 444 is the beam 428 put into motion by the oscillating mirror 442.

Of course, the beacon 444 may be generated from the beam 428 by another method without departing from the principles of the present invention. For example, a rotating polygonal mirror could be used to repeatedly and sequentially sweep the beam 428 across another plane or curved surface.

In a similar manner, the module 424 includes another light source 426 which produces a light beam 446. The light beam 446 is put into motion by another beacon generator 440, thereby producing another beacon 448. The beacon 448 sweeps across a plane above the upper surface of the keyboard 416. One portion of the beacon 448 is representatively illustrated in FIG. 12 striking the object 418.

It will be readily appreciated by one of ordinary skill in the art that the beacons 444, 448 sweep across intersecting or overlaid areas above the keyboard 416. These areas where both beacons 444, 448 sweep across the keyboard 416 form a light grid 450. The grid 450 may have any desired shape, depending upon the placement of the modules 422, 424 with respect to the keyboard 416, and with respect to each other. For example, both beacons 444, 448 may sweep above substantially all of the upper surface of the keyboard 416, in which case the light grid 450 would encompass substantially all of the upper surface of the keyboard. Alternatively, the beacons 444, 448 may only intersect or both overlay only a small area above the keyboard 416 upper surface.

Additionally, although the modules 422, 424 are representatively illustrated having their respective mirrors 442 positioned at upper left and upper right hand corners, respectively, of the keyboard 416 upper surface as viewed in FIG. 12, it is to be clearly understood that the modules and mirrors may be otherwise positioned without departing from the principles of the present invention. It will be readily appreciated by one of ordinary skill in the art that the shape of the light grid 450 may be conveniently changed by repositioning the modules 422, 424. However, for ease of calculating the object's 418 position, the modules 422, 424 preferably are not positioned so that the beacons 444, 448 are collinear at any time.

In order to calculate the position of the object 418, the beacons 444, 448 are reflected by the object back to the mirrors 442, thence to the mirrors 438, and thence to respective light sensors 452. The light sensors 452 detect the reflected beacons 444, 448 and, the positions and angular orientations of the respective mirrors 442 being known at the time the reflected beacons are detected, conventional triangulation techniques well known to those of ordinary skill in the art may be utilized to determine the position of the object 418. For example, if the beacon generators 440 include oscillating mirrors 442 having sinusoidal sweep rates, the sinusoidal function may be utilized to determine the angular positions of the respective mirrors 442 at the time the reflected beacons 444, 448 are detected by the respective sensors 452. As another example, if the beacon generators 440 include rotating mirrors having linear sweep rates, a linear function may be utilized to determine the angular positions of the respective mirrors.

In one embodiment of the present invention, the light sensors 452 may each include a photodiode which senses light intensity, and which is useful in the optical digitizer 420 for detecting the presence or absence of light reflected off of the object 418. In another embodiment of the present invention, each of the light sensors 452 may include a detector 454 known to those skilled in the art as an imaging detector, that is, a detector that responds to reception of light in two dimensions, typically by utilizing an array of photosensitive cells, such as a charge coupled device. Where imaging detectors 454 are used in the light sensors 452, the CPU 414 may be programmed with conventional image recognition software, so that the presence of the object 418 is detected when the image of the object is received by the detectors and that image matches the desired image, as determined by the image recognition program.

Referring additionally now to FIG. 13, a method by which the optical digitizer 420 may be modified to enhance its use is representatively illustrated. In FIG. 13, one of the oscillating mirrors 442 is shown directing the beacon 444 toward the object 418, which is representatively shown as a finger. The mirror 442 and object 418 are shown apart from the keyboard 416 and remainder of the optical digitizer 420 of FIG. 12 for illustrative clarity, and it is to be clearly understood that, although only one of the beacons 444, 448 and one of the oscillating mirrors 442 is shown in FIG. 13, that the modifications shown in FIG. 13 may also be applied to the other one of each in the optical digitizer.

In FIG. 13, the beacon 444 is modified by passing it through a lens 456 before the beacon strikes the object 418. The lens 456 is an elongated aspherical cylindrical lens which permits a horizontal "slice" 458 of the beacon 444 reflected off of the object 418 to be directed back to the mirror 442 and thence to the light sensor 452. In this manner, the light sensor 452 only "sees" the horizontal slice 458 of the reflected beacon 444, thereby limiting the amount of extraneous light received by the light sensor 452. Although in FIG. 13 the slice 458 is shown somewhat elevated in its intersection with the object 418, it is to be understood that this is merely illustrative, that the slice 458 may actually intersect the object at or near a lower tip 474 thereof, and that the width of the slice may be increased or decreased as desired.

It will be readily appreciated by one of ordinary skill in the art that other lenses, and other positionings of lenses, may be utilized to restrict the width, height, etc. of the beacons 444, 448 received by the light sensors 452. For example, a lens similar to, or differently configured as compared to, the lens 456 may be placed in the path of the reflected beacon 444 between the mirror 442 and the mirror 438, between the mirror 438 and the light sensor 452, etc.

To limit the amount of the beacon 444 inadvertently reflected back to the mirror 442, one or more optical barriers 460 may be placed about the periphery of the light grid 450.

The optical barriers is 460 may be made of, or coated with, a material or substance which does not reflect either of the beacons 444, 448, for example, the optical barrier 460 representatively illustrated in FIG. 13 may have a matte black finish applied thereto, so that a portion of the beacon 444 which does not strike the object 418 will not be reflected back to the mirror 442.

Other methods of enhancing the ability of the optical digitizer 420 to accurately detect the object 418 may be utilized without departing from the principles of the present invention. Referring additionally to FIG. 14, a lens 462 is positioned in each of the paths of the reflected beacons 444, 448 in the respective modules 422, 424 between the mirrors 438 and detectors 464 of the light sensors 452. In this manner, the beacons 444, 448 are focused on the detectors 464, so that only desired portions of the reflected beacons are within a produced depth of field.

In FIG. 14, the lens 462 of the module 422 focuses the reflected beacon 444 on the detector 464 so that the depth of field is approximately between the dashed lines 466 and 468. Similarly, the lens 462 of the module 424 focuses the reflected beacon 448 on its corresponding detector 464, so that the depth of field is approximately between the dashed lines 470 and 472. These depths of field, indicated approximately by the lines 466, 468, 470, 472 limit the effective light grid 450 produced by the overlapping beacons 444, 448. Thus, in FIG. 14, the effective light grid 450 is between the lines 466 and 468, and between lines 470 and 472.

To more clearly describe the use of the lenses 462 in the optical digitizer 420, the object 418 is representatively illustrated in three positions 418a, 418b, 418c with respect to the effective light grid 450. Correspondingly, the beacon 444 is shown in three positions 444a, 444b, 444c being reflected off of the object 418, and the beacon 448 is shown in three positions 448a, 448b, 448c also being reflected off of the object.

With the object 418 at position 418a, it is between the lines 466 and 468 and, therefore, is within the depth of field of the module 422. The object at position 418a is also between the lines 470 and 472, within the depth of field of the module 424. The object at position 418a is, thus, within the effective light grid 450 and its position may be easily determined as described hereinabove.

With the object 418 at position 418b, however, it is between the lines 470 and 472, within the depth of field of the module 424, but it is not between the lines 466 and 468 and, therefore, is not within the depth of field of the module 422. Thus, the module 422 will not detect a reflection of the beacon 444 off of the object at position 418b and the object is outside of the effective light grid 450. In this case, the position of the object 418 will not be determined.

With the object 418 at position 418c, it is not between the lines 466 and 468, nor is it between the lines 470, 472. Therefore, neither of the modules 422, 424 will detect reflections of the respective beacons 444, 448 off of the object 418 and the object is outside of the effective light grid 450. The position of the object 418 will also not be determined by the optical digitizer 420.

Thus, by creating overlapping depths of field using the lenses 462, the light grid 450 may be effectively limited to a desired area. In this manner, extraneous objects positioned outside of the effective light grid 450 will not cause the optical digitizer 420 to erroneously determine their positions. It will be readily appreciated by one of ordinary skill in the art that the lenses 462 may be otherwise positioned, and that other lenses, such as the lenses 456, may be used in combination with the lenses 462 in the optical digitizer 420.

The detectors 464 in the optical digitizer 420 as shown in FIG. 14 may be of the imaging type (such as a charge coupled device) or non-imaging type (such as a photodiode). Where the detectors 464 are of the non-imaging type, the lenses 456 may not be used in the optical digitizer 420.

Of course, modifications, substitutions, additions, deletions, and other changes may be made to the embodiments of the present invention described herein which changes would be obvious to one of ordinary skill in the art. Accordingly, the foregoing detailed description is to be clearly understood as being given by way of illustration and example only, the spirit and scope of the present invention being limited solely by the appended claims.

What is claimed is:

1. A method of optically determining an object's position, the method comprising the steps of:

produced a light grid including at least two beacons;

disposing the object within the light grid;

reflecting each of the at least two beacons off of the object to thereby produce corresponding at least two reflected beacons; and receiving each of the at least two reflected beacons into a respective one of at least two light sensors.

2. The method according to claim 1, wherein the producing step further comprises generating at least two light beams and sweeping the at least two light beams across an area to form the at least two beacons.

3. The method according to claim 2, wherein the generating step further comprises generating each of the at least two light beams from a respective one of at least two light sources.

4. The method according to claim 2, further comprising the steps of passing each of the at least two light beams through a respective one of at least two beam splitters.

5. The method according to claim 4, further comprising the step of reflecting each of the at least two reflected beacons off of a respective one of the at least two beam splitters and to a respective one of the light sensors.

6. The method according to claim 2, wherein the sweeping step further comprises reflecting each of the at least two light beams off of a respective one of at least two mirrors.

7. The method according to claim 6, wherein in the sweeping step, each of the at least two mirrors is oscillated.

8. The method according to claim 1, further comprising the step of disposing a lens in the optical path of at least one of the at least two reflected beacons to thereby focus the one of the at least two reflected beacons on the respective one of the at least two light sensors.

9. The method according to claim 8, wherein the lens disposing step further comprises producing a depth of field of the focused one of the at least two reflected beacons.

10. The method according to claim 1, further comprising the step of disposing a non-reflective material about a periphery of the light grid.

11. The method according to claim 1, further comprising the step of disposing a lens in the optical path of at least one of the at least two reflected beacons to thereby limit a selected one of a width and a height of the at least one of the at least two reflected beacons received into the respective one of the at least two light sensors.

12. The method according to claim 11, wherein in the lens disposing step, the lens is a generally cylindrical aspherical lens.

13. The method according to claim 1, wherein in the receiving step at least one of the at least two light sensors includes an imaging detector.

14. The method according to claim 13, wherein the receiving step further comprises receiving an image of the object into the imaging detector when the object is in the light grid.

15. The method according to claim 14, further comprising the step of comparing the image of the object to a predetermined image characteristic stored in a CPU.

16. A method of determining an object's position, the method comprising the steps of:

providing first and second modules, the first module being capable of producing a first beacon and sensing the first beacon when it is reflected off of the object, and the second module being capable of producing a second beacon and sensing the second beacon when it is reflected off of the object;

positioning the first and second modules relative to a surface, so that a light grid is produced overlying the surface;

reflecting the first and second beacons off of the object; and sensing the reflected first and second beacons.

17. The method according to claim 16, wherein in the positioning step, the surface is an upper surface of a computer keyboard, and wherein the light grid is positioned above, and spaced apart from, keys of the keyboard.

18. The method according to claim 16, further comprising the step of timing the reflected first and second beacons to thereby determine an angular orientation of the object relative to each of the first and second modules.

19. The method according to claim 16, wherein the sensing step further comprises sensing first and second images of the object from respective ones of the first and second reflected beacons.

20. The method according to claim 16, further comprising the step of limiting a depth of field of the first module.

21. The method according to claim 20, wherein the limiting step is performed by disposing a lens in the optical path of the reflected first beacon.

22. The method according to claim 21, wherein the lens is not disposed in the optical path of the first beacon before the first beacon is reflected off of the object.

23. The method according to claim 16, further comprising the step of limiting a dimension of the first reflected beacon sensed by the first module.

24. The method according to claim 23, wherein the limiting step is performed by disposing a lens in the optical path of the reflected first beacon.

25. The method according to claim 23, wherein in the limiting step, a selected one of a height and a width of the first reflected beacon is limited.

26. Apparatus for optically determining an object's position relative to a surface, the apparatus comprising:

first and second beacon generators positioned relative to the surface; and first and second light sensors, each of the first and second light sensors being disposed relative to a respective one of the first and second beacon generators, so that a first beacon produced by the first beacon generator and reflected off of the object is receivable by the first light sensor, and a second beacon produced by the second beacon generator and reflected off of the object is receivable by the second light sensor, the apparatus being free of reflective material for reflecting any portions of the first and second beacons that are not reflected off of the object to the first and second light sensors.

27. The apparatus according to claim 26, further comprising a lens disposed relative to the first light sensor, the lens being capable of focusing the first beacon on the first light sensor when the first beacon has been reflected off of the object.

28. The apparatus according to claim 26, further comprising a lens disposed relative to the first beacon generator, the lens being capable of limiting a dimension of the first beacon received by the first light sensor when the first beacon has been reflected off of the object.

29. The apparatus according to claim 26, wherein the first light sensor includes an imaging detector.

30. A computer system for optically determining an object's position, the computer system comprising:

a monitor;

a central processing unit interconnected to the monitor;

a surface relative to which the object's position is to be determined;

first and second beacon generators positioned relative to the surface; and first and second light sensors interconnected to the central processing unit, each of the first and second light sensors being disposed relative to a respective one of the first and second beacon generators, so that a first beacon produced by the first beacon generator and reflected off of the object is receivable by the first light sensor, and a second beacon produced by the second beacon generator and reflected off of the object is receivable by the second light sensor, the computer system being free of reflective material for reflecting any portions of the first and second beacons that are not reflected off of the object to the first and second light sensors.

31. The computer system according to claim 30, further comprising a lens disposed relative to the first light sensor, the lens being capable of focusing the first beacon on the first light sensor when the first beacon has been reflected off of the object.

32. The computer system according to claim 30, further comprising a lens disposed relative to the first beacon generator, the lens being capable of limiting a dimension of the first beacon received by the first light sensor when the first beacon has been reflected off of the object.

33. The computer system according to claim 30, wherein the first light sensor includes an imaging detector.

34. The computer system according to claim 30, wherein the surface is an upper surface of a keyboard interconnected to the central processing unit.

* * * * *